US010230679B1

(12) United States Patent
Kielhofner et al.

(10) Patent No.: US 10,230,679 B1
(45) Date of Patent: Mar. 12, 2019

(54) SYSTEMS AND METHODS FOR OPTIMIZING APPLICATION DATA DELIVERY OVER THIRD PARTY NETWORKS

(75) Inventors: Kristian Kielhofner, Sarasota, FL (US); Gabriel Shepard, Parrish, FL (US); Shawn Solomon, Palmetto, FL (US)

(73) Assignee: STAR2STAR COMMUNICATIONS, LLC, Sarasota, FL (US)

( * ) Notice: Subject to any disclaimer, the term of this patent is extended or adjusted under 35 U.S.C. 154(b) by 1448 days.

(21) Appl. No.: 13/592,035

(22) Filed: Aug. 22, 2012

Related U.S. Application Data

(60) Provisional application No. 61/526,119, filed on Aug. 22, 2011.

(51) Int. Cl.
*G06F 15/16* (2006.01)
*H04L 12/58* (2006.01)
*H04L 29/06* (2006.01)

(52) U.S. Cl.
CPC ............ *H04L 51/32* (2013.01); *H04L 65/403* (2013.01)

(58) Field of Classification Search
CPC .............................. H04L 51/32; H04L 65/403
See application file for complete search history.

(56) References Cited

U.S. PATENT DOCUMENTS

| | | | |
|---|---|---|---|
| 5,732,072 A | 3/1998 | Thanner et al. | |
| 6,298,043 B1 | 10/2001 | Mauger et al. | |
| 8,149,716 B2 | 3/2012 | Ramanathan et al. | |
| 8,184,620 B2 | 5/2012 | Dusch et al. | |
| 8,289,979 B2 | 10/2012 | Hiie et al. | |
| 8,325,638 B2 | 12/2012 | Jin et al. | |
| 8,351,333 B2 | 1/2013 | Rao et al. | |
| 8,369,213 B2 | 2/2013 | Vasseur et al. | |
| 8,392,583 B2 | 3/2013 | Bijwaard et al. | |
| 8,675,493 B2 | 3/2014 | Buddhikot et al. | |
| 8,792,420 B2 | 6/2014 | Hsu et al. | |
| 8,767,532 B2 | 7/2014 | Vasseur et al. | |
| 8,879,426 B1 | 11/2014 | Quiling et al. | |
| 9,491,004 B2 | 11/2016 | Park | |

(Continued)

FOREIGN PATENT DOCUMENTS

EP 2744175 A1 6/2014

*Primary Examiner* — Moustafa M Meky
*Assistant Examiner* — Sm Z Islam
(74) *Attorney, Agent, or Firm* — Morris, Manning & Martin, LLP; Daniel E. Sineway, Esq.; Bryan D. Stewart, Esq.

(57) ABSTRACT

Aspects of the present disclosure generally relate to systems and methods for managing and optimizing end-to-end communication sessions involving the delivery of application data (e.g., audio (voice) data, audio/video data, electronic file download data, etc.) over third party networks using an optimized communication system (OCS), as described herein. Embodiments of the disclosed system provide and maintain optimal quality (e.g., reduced delay, packet loss, jitter, etc.) of communication sessions. In one example, the system provides (a real-time or close to real-time) evaluation of the network conditions, e.g., which networks are congested, and other factors associated with geographically diverse and unpredictable routing infrastructure characteristics of the Internet.

24 Claims, 11 Drawing Sheets

OVERVIEW OF EXEMPLARY OPTIMIZED COMMUNICATION SYSTEM ENVIRONMENT

(56) References Cited

U.S. PATENT DOCUMENTS

| | | |
|---|---|---|
| 2002/0010798 A1* | 1/2002 | Ben-Shaul .......... G06F 17/3089 709/247 |
| 2004/0004938 A1 | 1/2004 | Buddhikot et al. |
| 2004/0006613 A1 | 1/2004 | Lemieux et al. |
| 2004/0246975 A1 | 12/2004 | Joshi |
| 2004/0253948 A1* | 12/2004 | Laberteaux .......... H04W 84/00 455/422.1 |
| 2006/0133337 A1 | 6/2006 | An et al. |
| 2006/0187866 A1 | 8/2006 | Werb et al. |
| 2006/0268727 A1 | 11/2006 | Rangarajan et al. |
| 2007/0094325 A1 | 4/2007 | Ih et al. |
| 2007/0127421 A1* | 6/2007 | D'Amico .......... H04W 72/005 370/338 |
| 2008/0002727 A1* | 1/2008 | Yamane .......... H04L 12/1836 370/401 |
| 2008/0137591 A1 | 6/2008 | Hirano et al. |
| 2008/0151746 A1 | 6/2008 | Vasseur et al. |
| 2008/0159271 A1* | 7/2008 | Kutt .......... H04L 12/581 370/352 |
| 2008/0186873 A1* | 8/2008 | Pujet .......... H04L 41/0826 370/254 |
| 2009/0129316 A1 | 5/2009 | Ramanathan et al. |
| 2009/0158362 A1 | 6/2009 | Kajos |
| 2009/0172174 A1 | 7/2009 | Zha |
| 2010/0016008 A1 | 1/2010 | Brewer et al. |
| 2010/0091707 A1 | 4/2010 | Janneteau et al. |
| 2010/0142373 A1 | 6/2010 | Jin et al. |
| 2010/0142646 A1 | 6/2010 | Hensley |
| 2010/0150028 A1* | 6/2010 | Campbell .......... H04L 12/2852 370/255 |
| 2010/0211689 A1 | 8/2010 | Bijwaard et al. |
| 2010/0260192 A1 | 10/2010 | Hiie et al. |
| 2010/0272062 A1 | 10/2010 | Velev et al. |
| 2010/0278069 A1* | 11/2010 | Sharma .......... H04L 45/02 370/254 |
| 2010/0315992 A1 | 12/2010 | Turányi |
| 2010/0317284 A1 | 12/2010 | Charbit et al. |
| 2010/0325299 A1 | 12/2010 | Rao et al. |
| 2011/0153843 A1 | 6/2011 | Hsu et al. |
| 2011/0165901 A1* | 7/2011 | Baniel .......... H04M 15/66 455/500 |
| 2011/0289230 A1 | 11/2011 | Ueno |
| 2011/0320588 A1* | 12/2011 | Raleigh .......... H04W 36/245 709/224 |
| 2013/0051224 A1 | 2/2013 | Vasseur et al. |
| 2013/0159432 A1 | 6/2013 | Deering et al. |
| 2013/0166625 A1 | 6/2013 | Swaminathan et al. |
| 2014/0269333 A1 | 9/2014 | Boerjesson |
| 2014/0293787 A1 | 10/2014 | Bourdelles et al. |

\* cited by examiner

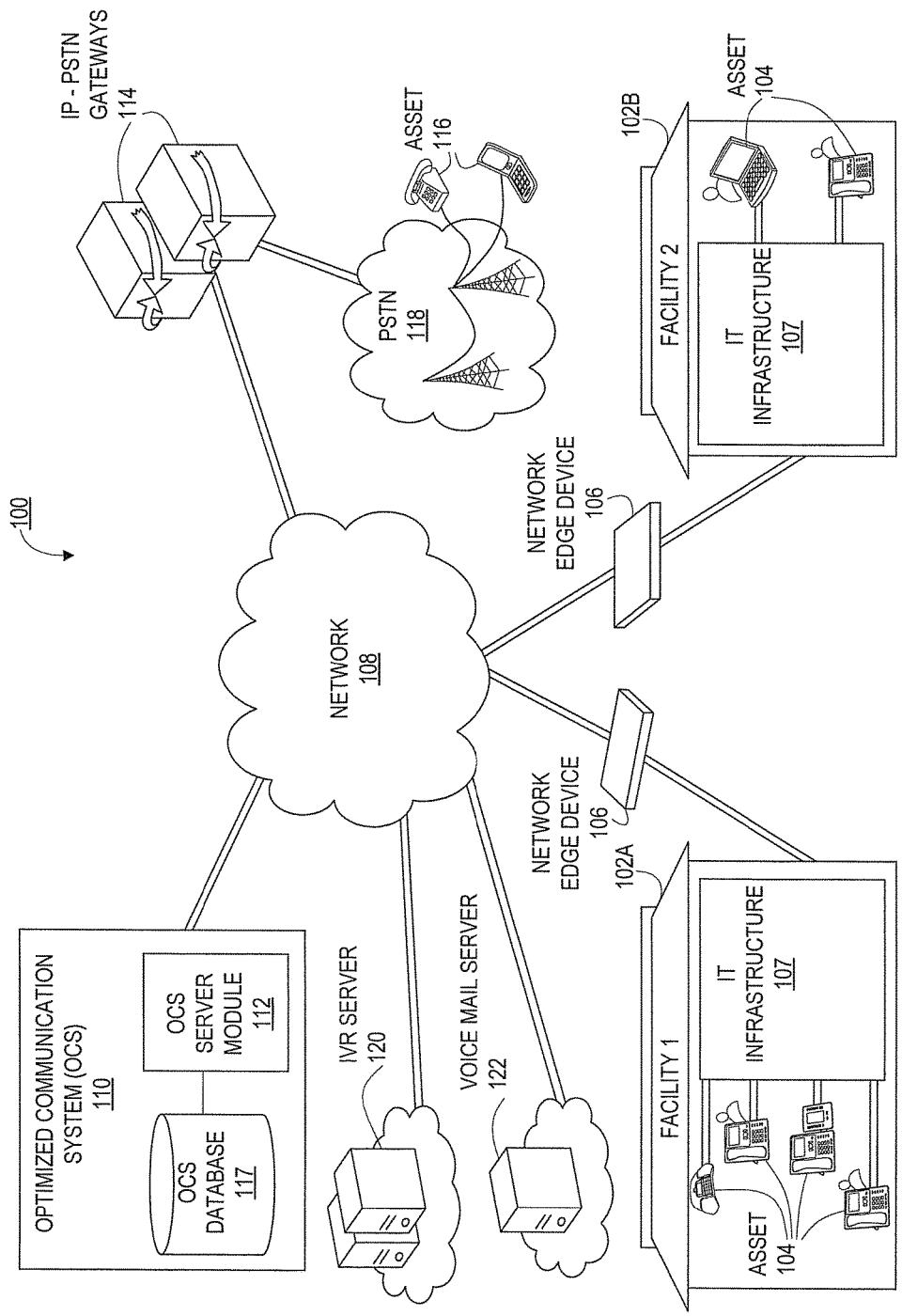
*FIG. 1* OVERVIEW OF EXEMPLARY OPTIMIZED COMMUNICATION SYSTEM ENVIRONMENT

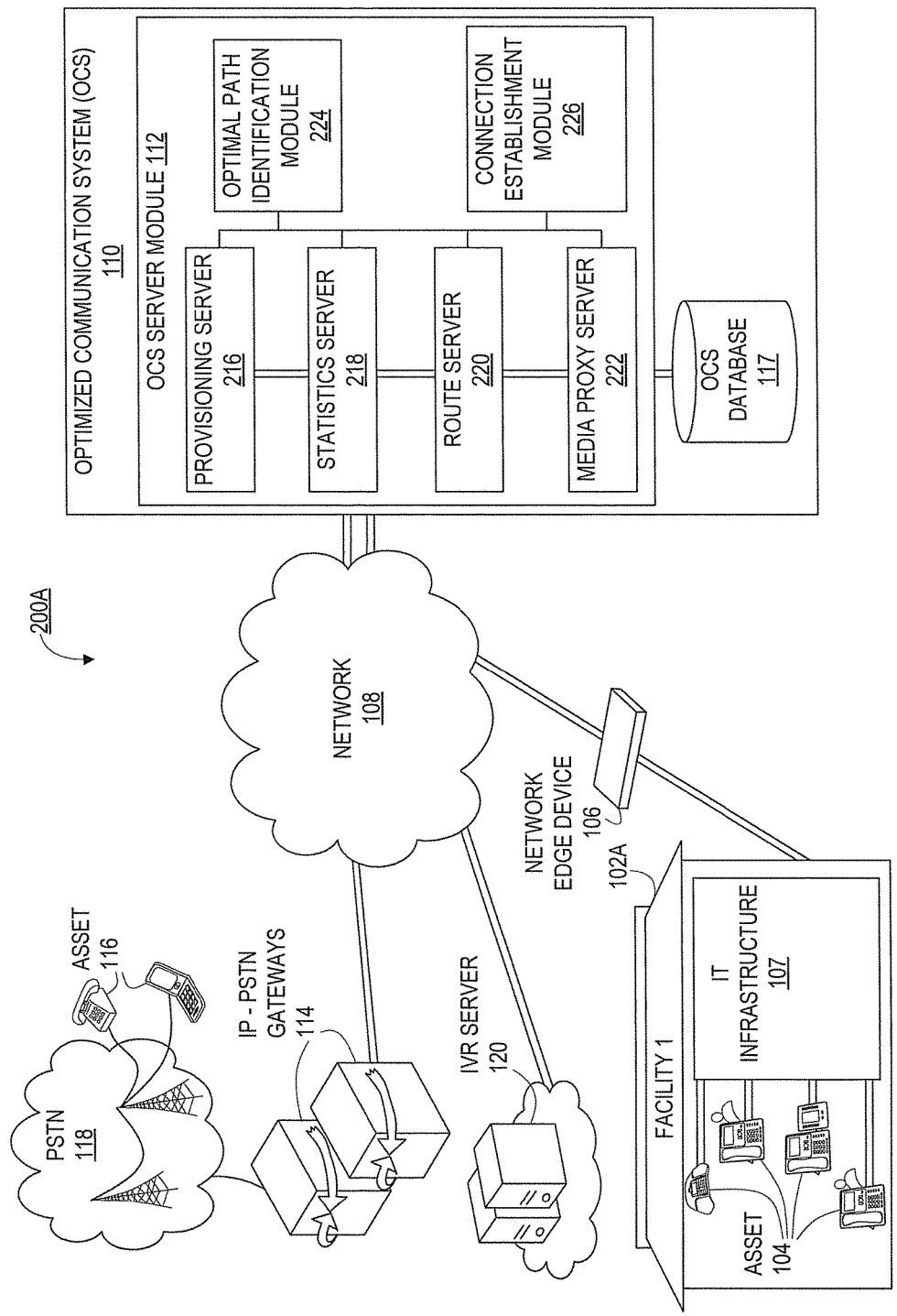
*FIG. 2A* EXEMPLARY OCS ARCHITECTURE

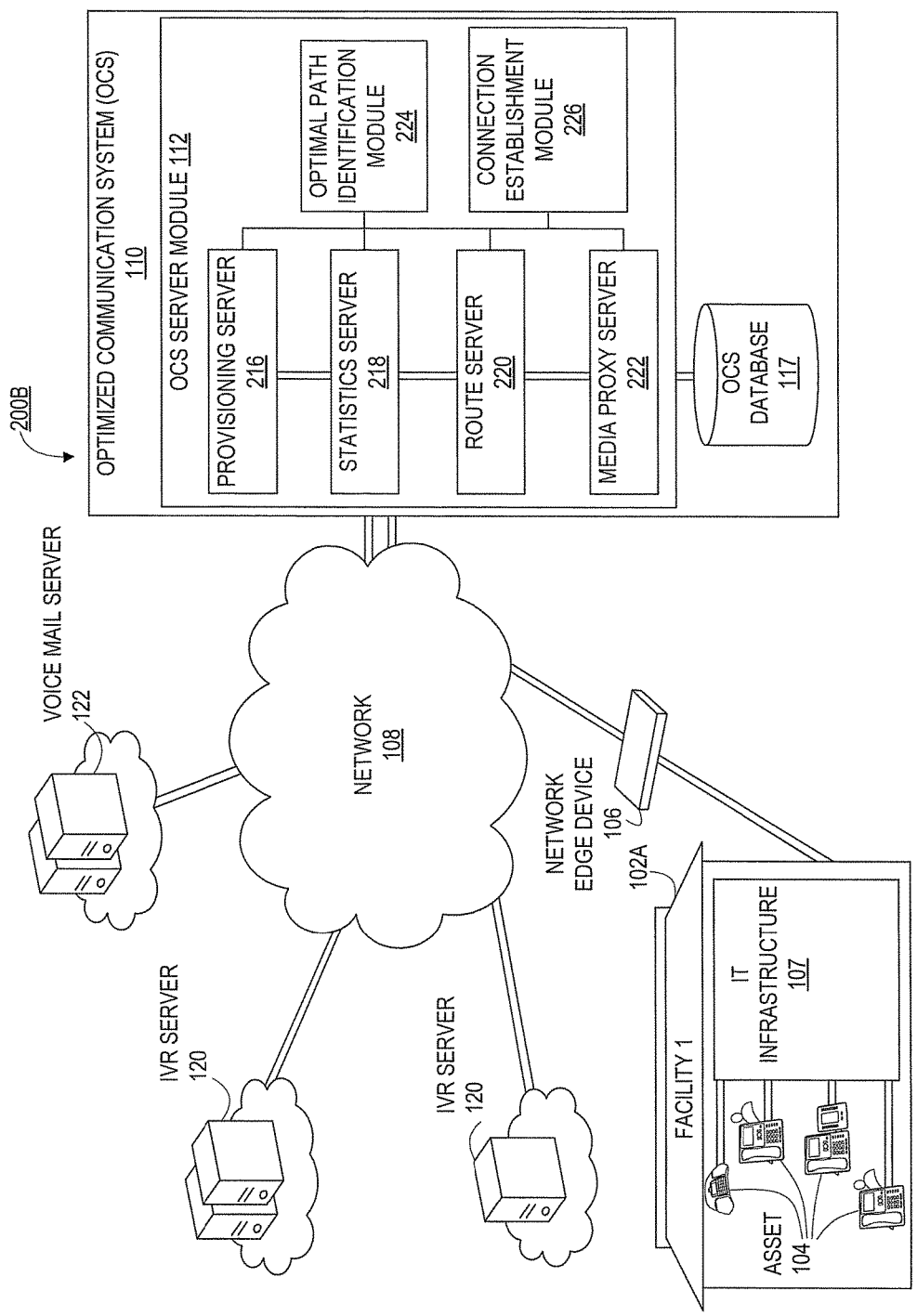
FIG. 2B EXEMPLARY OCS ARCHITECTURE (ALTERNATE EMBODIMENT)

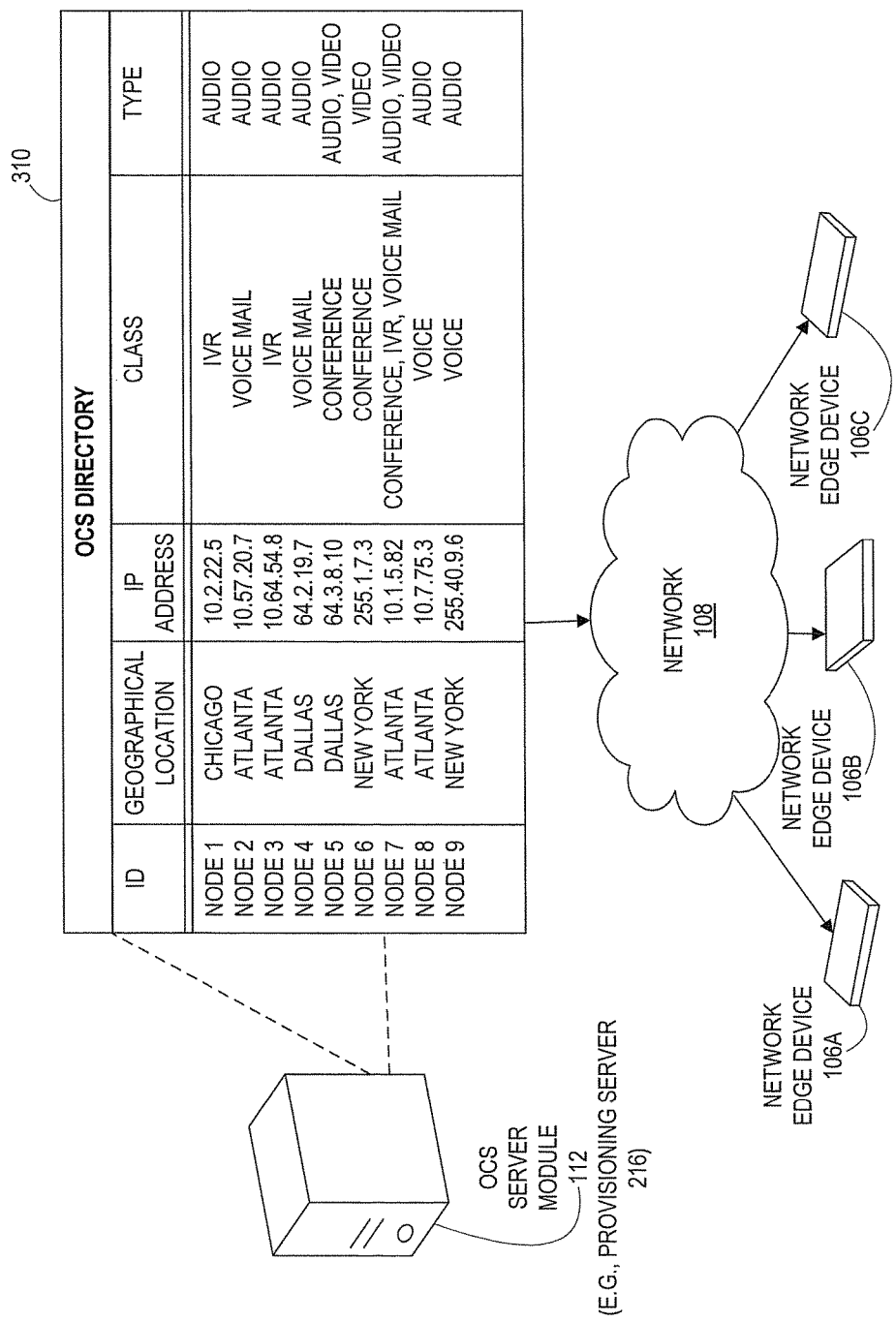
FIG. 3 *EXEMPLARY SCHEMATIC OF OCS DIRECTORY*

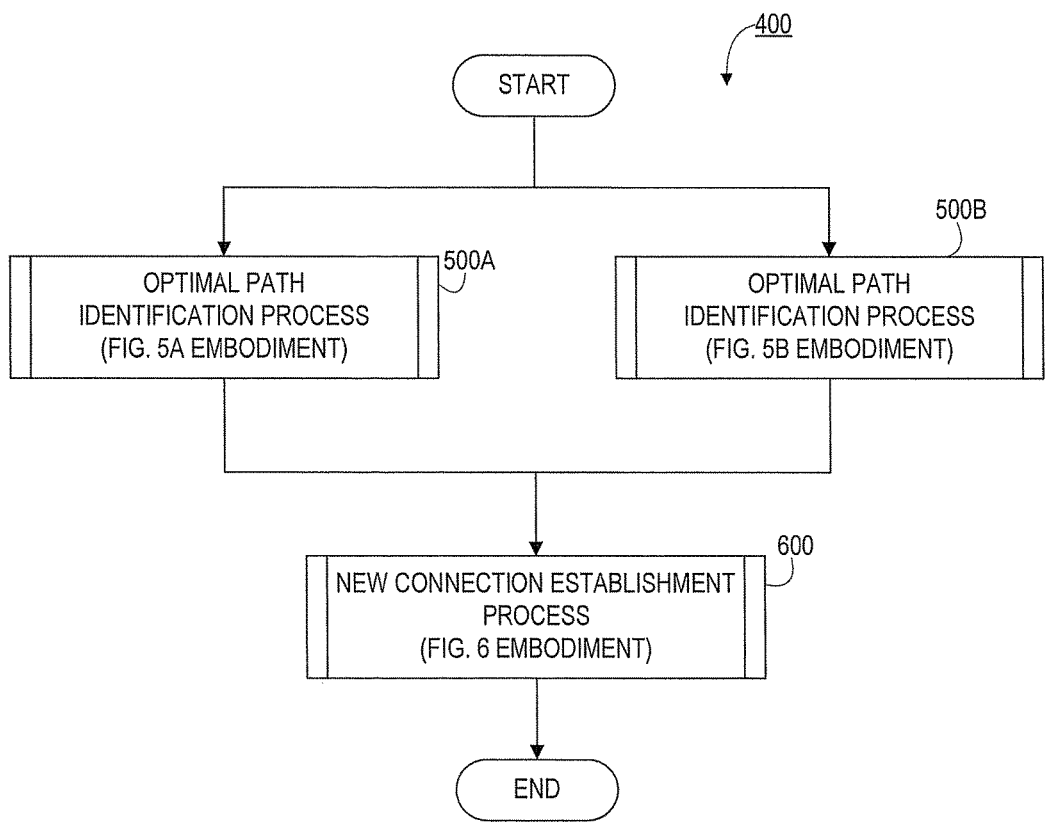
*FIG. 4* EXEMPLARY HIGH-LEVEL OCS PROCESSES

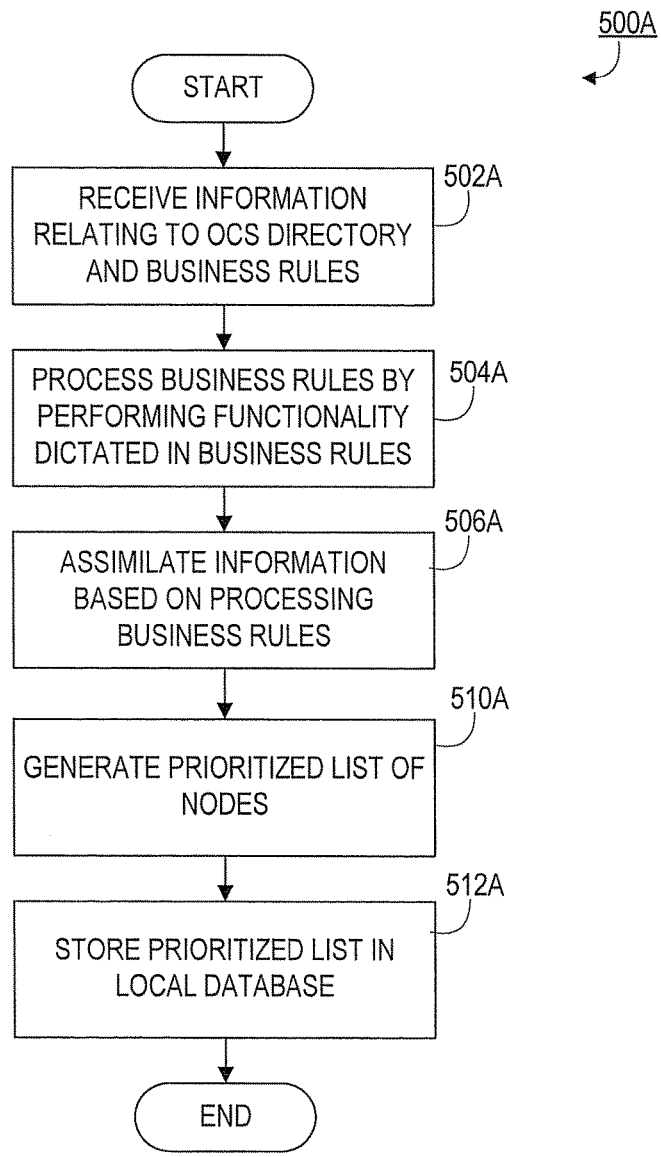
*FIG. 5A* EXEMPLARY OPTIMAL PATH IDENTIFICATION PROCESS

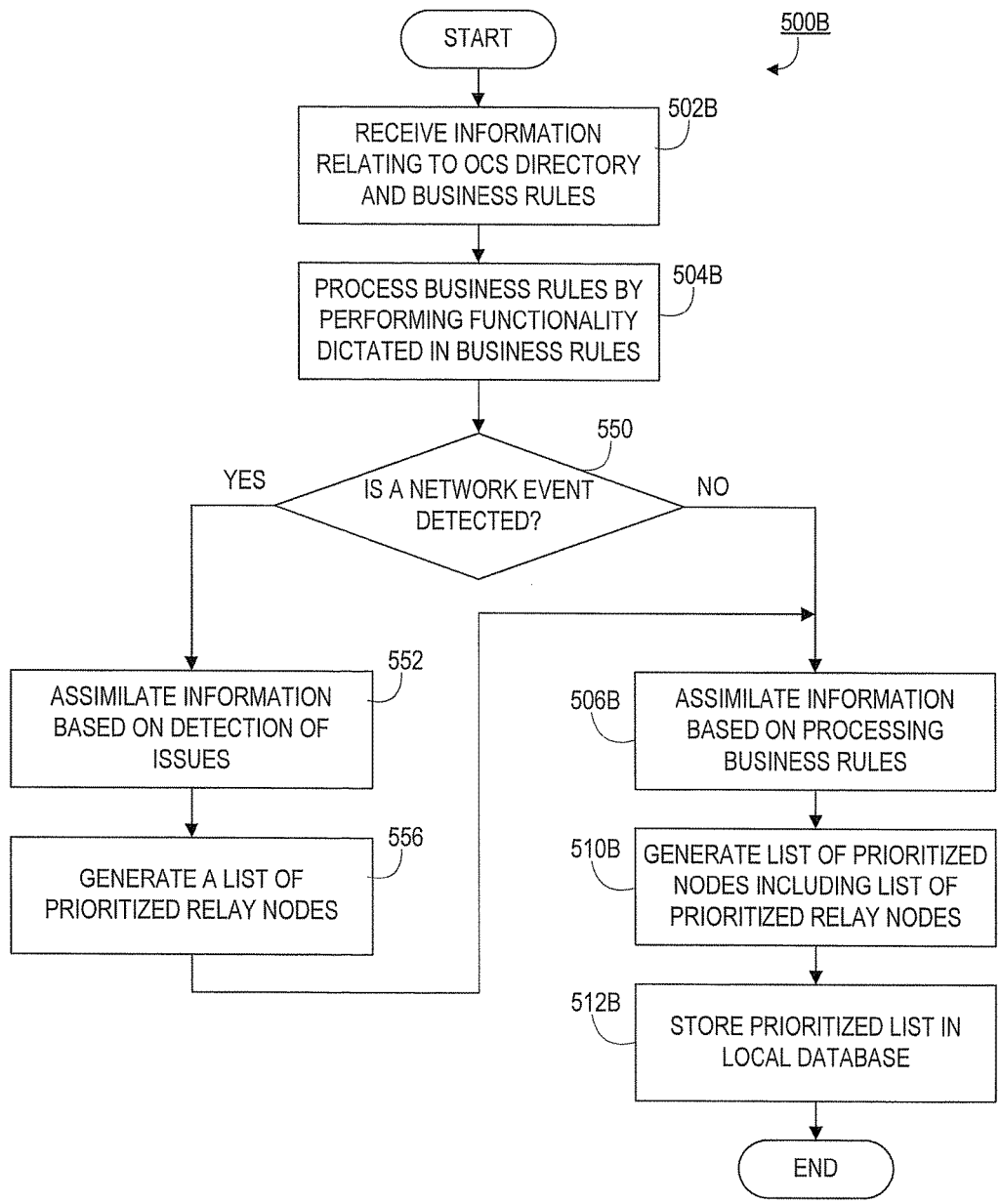
FIG. 5B *EXEMPLARY OPTIMAL PATH IDENTIFICATION PROCESS (ALTERNATE EMBODIMENT)*

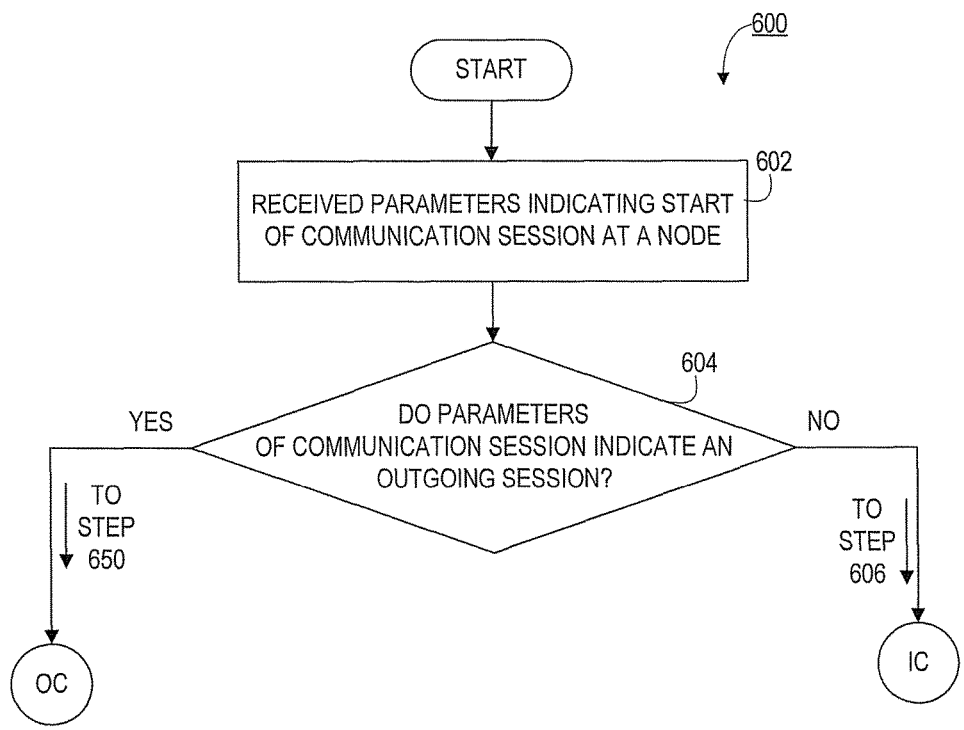
*FIG. 6* EXEMPLARY CONNECTION ESTABLISHMENT PROCESS

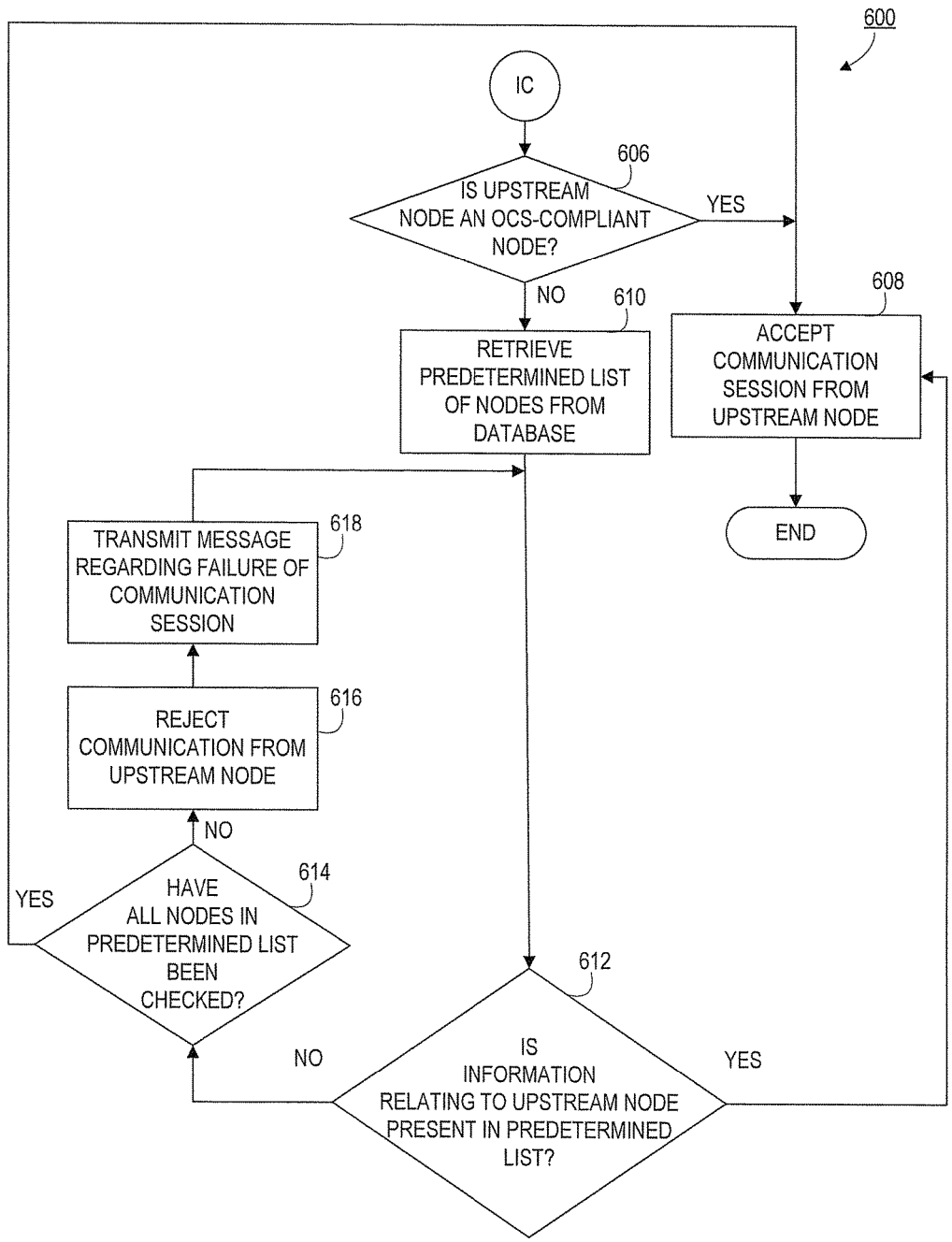
*FIG. 6* *(CONTINUED) EXEMPLARY CONNECTION ESTABLISHMENT PROCESS*

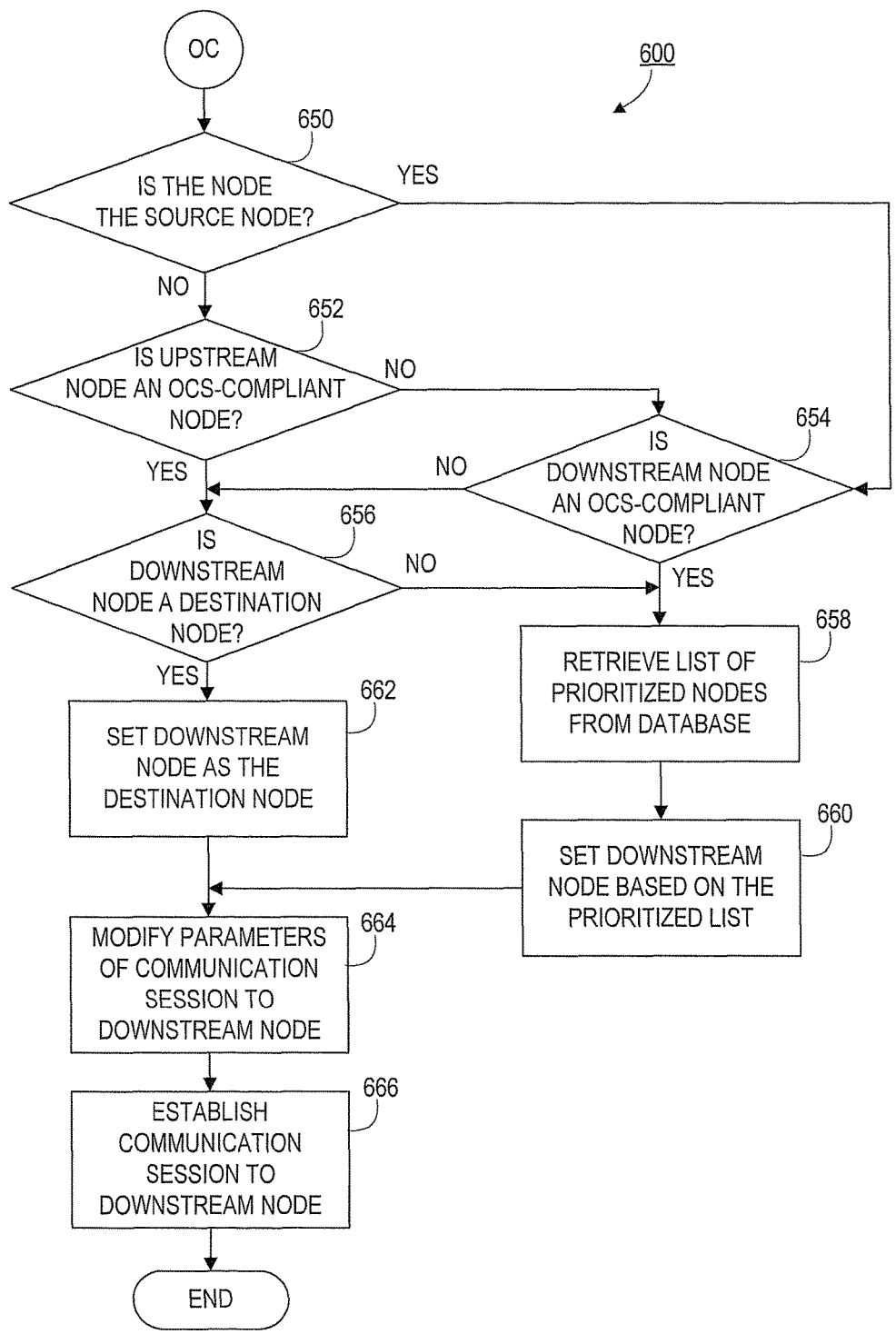
*FIG. 6 (CONTINUED) EXEMPLARY CONNECTION ESTABLISHMENT PROCESS*

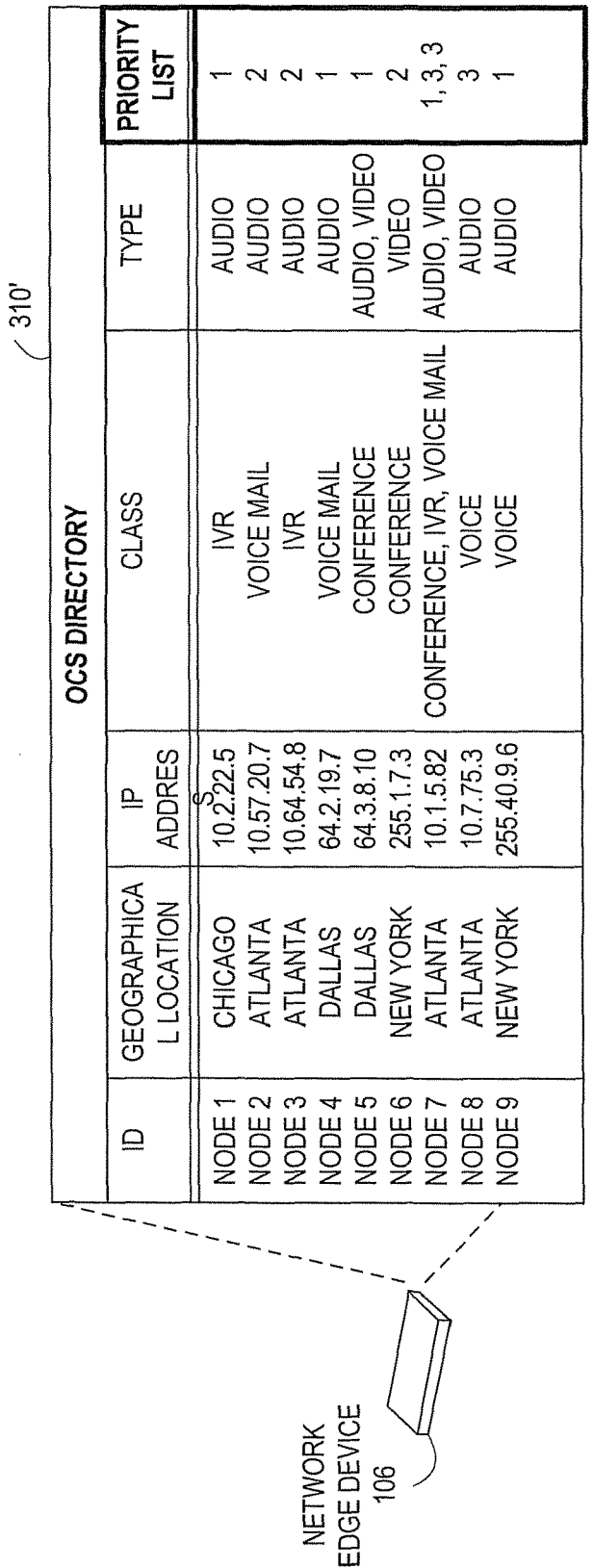
FIG. 7 *EXEMPLARY SCHEMATIC SHOWING PRIORITIZED LIST OF NODES*

SYSTEMS AND METHODS FOR OPTIMIZING APPLICATION DATA DELIVERY OVER THIRD PARTY NETWORKS

CROSS REFERENCE TO RELATED APPLICATION

This application claims benefit under 35 U.S.C. § 119(e) of U.S. Provisional Patent Application No. 61/526,119, filed Aug. 22, 2011, and entitled "Application Optimized Data Transport Over Third Party Networks", which is incorporated herein by reference as if set forth herein in its entirety.

TECHNICAL FIELD

The present system and methods relate generally to electronic communication systems, and more particularly to managing end-to-end (i.e., from an originating source to a terminating destination) communication sessions involving delivery of application data (e.g., audio (voice) data, audio/video data, electronic file downloads, etc.) over one or more third party networks. Embodiments of the disclosed system provide and maintain optimal quality (e.g., reduced delay, packet loss, jitter, etc.) of communication sessions.

BACKGROUND

Over the last few years, significant changes have taken place in the telephony industry. Traditionally, phone calls are made over dedicated telephone circuits over the Public Switched Telephone Network (PSTN). In the PSTN world, a "line" is an electrical circuit that is set up and provided to a customer for a phone call. Such a circuit remains in place for the duration of a phone call. The circuits typically connect an on-premise Private Branch Exchange (PBX) system at a facility to a telephone company switch. If a business customer needs to potentially handle 100 calls at any given time, then they will need 100 circuits.

With the advent of Voice over Internet Protocol (VoIP) technology, many people and businesses are switching to VoIP phone systems. VoIP telephones can communicate with conventional telephones, and vice-versa. In a VoIP call, a speaker's speech is digitized at the originating end, and is transmitted as small bundles of data (called "packets") over the Internet. At the receiving end, the packets are reassembled into a signal audible to the human ear. Although the name VoIP includes the word "voice", VoIP technologies are used for transporting just not audio or voice data, but video (multimedia), file download data, and other types of data as well. The advantages of VoIP solutions over traditional telephone systems include reduced equipment and phone services cost, useful communication-related features, and the ability to integrate a person's phone with other computing devices.

Typically, VoIP calls share a data network with other computing devices as VoIP calls are carried over the Internet. However, the Internet is a large collection of networks owned and operated by different and unrelated third parties, thus making it very difficult to control the path of individual packets. For example, packets can be lost, delayed, or corrupted as they travel from a source to a destination hopping through intermediate computer nodes. If one or more intermediate computer networks (or nodes) are down (due to disaster, natural calamities, routine maintenance, or some other unpredictable reason), the packets may need to be re-routed through some other computer networks (or nodes). To summarize, the geographically diverse and unpredictable routing infrastructure of the Internet poses significant problems for routing VoIP packets and other data transfer communications.

Furthermore, different applications (and their associated data) leveraging VoIP systems have unique and diverse requirements/characteristics. For example, a VoIP connection (or other data transfer connection or protocol) can be used for transferring a voice call (i.e., audio data) for a call-based application, and can also be used for downloading large files for a web download application. However, the requirements for these two different applications are different. Because web browsing experiences are not significantly affected by connection delays, a 150 millisecond delay may pass unnoticed to a user downloading large files as long as the download speed is sufficient. That is, such a user would still receive their requested information quickly as long as the download speeds are acceptable, and a small delay at the beginning of the download would be virtually imperceptible. However, a 150 millisecond delay in transferring voice (audio data) during a call would be extremely frustrating to users, and could even result in interference with natural speech progression or an "echo". Thus, applications leveraging VoIP systems or other data transfer systems usually have unique requirements that are usually not provided by conventional non-optimized VoIP systems.

Generally speaking, a VoIP system comprises three parts: at least one on-premise PBX system, a VoIP service over computer networks, and one or more VoIP-compatible devices (e.g., telephones) installed at a premise. Conventional VoIP systems typically offer a solution that takes a segmented approach by addressing a specific portion of these three above-mentioned parts. For example, some VoIP systems specialize in the PBX system but do not address the VoIP service. Other systems offer VoIP service but not the on-premise PBX system(s). Consequently, such approaches suffer from limited flexibility, features and reliability, and are usually affected by network congestion and delays.

Therefore, there is a long-felt but unresolved need for a system or method that unifies the on-premise PBX systems, the VoIP service, and the VoIP-compatible devices so as to provide an end-to-end optimized delivery of application data over data networks. The system should be sophisticated to include monitoring and management functionalities, and adjust communication session parameters to assure the best possible quality. For example, the system should provide (a real-time or close to real-time) evaluation of the network conditions, e.g., which networks are congested, and other factors associated with the geographically diverse and unpredictable routing infrastructure of the Internet. The system should be able to optimally adapt for a wide variety of applications that leverage the VoIP connection.

Additionally, the system should be easily scalable, i.e., users or consumers of the system can order as many lines as they expect to need during peak times. Also, in the event of seasonal or unexpected VoIP traffic increases, the system should be able to provision extra VoIP circuits "on the fly" to handle such increases. Moreover, the system should be able to provide notification (along with relevant recommendations) to a user if anomalies in the network are detected, e.g., in the event of a degrading local area or wide area network connection. The system should be reliable, flexible, and easy to use, and yet provide users with a variety of useful communication-related features (e.g., automatic attendants, multi party conferencing, unlimited voice mail, etc.) in addition to cost savings.

BRIEF SUMMARY OF THE DISCLOSURE

Briefly described, and according to one embodiment, aspects of the present disclosure generally relate to systems and methods for managing and optimizing end-to-end communication sessions involving the delivery of application data (e.g., audio (voice) data, audio/video data, electronic file download data, etc.) over third party networks using an optimized communication system (OCS), as described herein. Embodiments of the disclosed system provide and maintain optimal quality (e.g., reduced delay, packet loss, jitter, etc.) of communication sessions. In one example, the system provides (a real-time or close to real-time) evaluation of the network conditions, e.g., which networks are congested, and other factors associated with geographically diverse and unpredictable routing infrastructure characteristics of the Internet. For the purposes of this disclosure, it will be generally understood that communication sessions utilize VoIP technologies and other data and information transfer technologies and protocols (as will occur to one of ordinary skill in the art) for transporting audio (voice) data, audio/video data, electronic file download data, etc. unless specifically stated otherwise.

Aspects of the disclosed system enables monitoring and managing all aspects of communication sessions that originate or terminate via various communication devices (e.g., phones, computers, audio/video conferencing equipment and the like). In one embodiment, the disclosed system utilizes a distributed architecture comprising a plurality of nodes, specifically, on-premise devices (e.g., installed at different geographical facilities) and off-premise servers that are operatively connected via one or more third party communication networks. Communication sessions proceed through communication session routes (or simply "routes") that are determined to be optimal by the OCS by monitoring network conditions and utilizing various business rules, wherein the routes proceed through one or more OCS nodes, as well as non-OCS nodes.

In one aspect, by monitoring network conditions in real time and non-real time, the OCS and its associated distributed architecture provides Quality of Service (QoS) guarantees by configuration, prioritization, and shaping of network traffic so as to provide and maintain optimal quality (e.g., reduced delay, packet loss, jitter, etc.) of certain types of communication sessions. In other aspects, system administrators, users of the OCS, and even software installed in the on-premise devices can specify business rules comprising various criteria that generally govern requirements of communication sessions. Examples of such criteria include a bandwidth requirement, a maximum tolerable packet loss rate, one or more allowable applications, number of active on-premise devices simultaneously engaged in communication sessions, a maximum tolerable delay in data transfer such as a voice transfer, a maximum tolerable jitter, a minimum video frame rate, allowable geographical location of intermediate nodes, etc. Aspects of the OCS, including (but not limited to) the distributed architecture of the OCS, monitoring of network conditions, applications of various business rules to the outcomes of monitoring network conditions, and several other concepts will be better understood from the discussions that follow herein.

These and other aspects, features, and benefits of the claimed invention(s) will become apparent from the following detailed written description of the preferred embodiments and aspects taken in conjunction with the following drawings, although variations and modifications thereto may be effected without departing from the spirit and scope of the novel concepts of the disclosure.

BRIEF DESCRIPTION OF THE DRAWINGS

The accompanying drawings illustrate one or more embodiments and/or aspects of the disclosure and, together with the written description, serve to explain the principles of the disclosure. Wherever possible, the same reference numbers are used throughout the drawings to refer to the same or like elements of an embodiment, and wherein:

FIG. 1 illustrates an exemplary environment in which an embodiment of the disclosed optimized communication system ("OCS") is utilized.

FIG. 2A illustrates an exemplary system architecture of the OCS, according to one embodiment of the present disclosure.

FIG. 2B illustrates an exemplary system architecture of the OCS, according to an alternate embodiment of the present disclosure.

FIG. 3 is an exemplary schematic showing an OCS directory including various types of information pertaining to communication nodes and communication sessions.

FIG. 4 is a flowchart showing high-level, computer-implemented method steps illustrating overall OCS processes, performed by various software modules of the OCS, according to one embodiment of the present system.

FIG. 5A is a flowchart showing an exemplary computer-implemented optimal path identification process, according to one embodiment of the present system.

FIG. 5B is a flowchart showing an exemplary computer-implemented optimal path identification process, according to an alternate embodiment of the present system.

FIG. 6 is a flowchart showing an exemplary computer-implemented connection establishment (i.e., communication session establishment) process, according to one embodiment of the present system.

FIG. 7 is an exemplary representation of an optimized list of communication nodes, according to one embodiment of the present system.

DETAILED DESCRIPTION

Prior to a detailed description of the disclosure, the following definitions are provided as an aid to understanding the subject matter and terminology of aspects of the present systems and methods, are exemplary, and not necessarily limiting of the aspects of the systems and methods, which are expressed in the claims. Whether or not a term is capitalized is not considered definitive or limiting of the meaning of a term. As used in this document, a capitalized term shall have the same meaning as an uncapitalized term, unless the context of the usage specifically indicates that a more restrictive meaning for the capitalized term is intended. However, the capitalization or lack thereof within the remainder of this document is not intended to be necessarily limiting unless the context clearly indicates that such limitation is intended.

Definitions/Glossary

Assets: electrical or electronic equipment that are connected to an IT infrastructure and that enable or are related to electronic communications (e.g., communication sessions). Examples of assets include, but are not limited to, VoIP phones, mobile phones, fax machines, conventional Plain Old Telephony System (POTS) phones, smartphones, cordless phones, conference room speaker phones, computers, Bluetooth-enabled phones, laptops, audio/video conferencing equipment, electronic gaming equipment, printers, copiers, tablet computers, or more generally, any kind of network communication device. Generally synonymous with communication asset.

Business Rules: generally include one or more instructions or specific criteria indicating one or more actions to be taken with respect to optimizing communication sessions for a given node or nodes, and/or obtaining information that enables optimization of communication sessions involving the delivery of application data over third party networks. In one aspect, business rules define information needed to optimize certain communication sessions, ways to obtain such information, how to process such information, path and/or node ranking methodologies, and include other similar types of information. Such actions dictated by business rules may be associated with satisfaction of a set of communication session criteria or conditions. Business rules generally include at least one condition and one corresponding action, but may include a variety of conditions and/or sets of actions. Business rules are generally predetermined and/or created by system administrators, system users, on the fly by proprietary learning algorithms operating on communication nodes, and the like.

Call: generally synonymous with communication session (referenced below).

Communication Session: an electronic transfer of data via one or more third party networks. Generally includes transfer through a series of communication nodes. A communication session generally comprises data packets (both signaling and data packets, or simply one of the same) passed through a communication protocol and relating to one or more of the following applications: audio only; audio and video; audio and data; or audio, video, and data over a digital medium. Generally synonymous with connection.

Communication Session Criteria: generally relates to criteria (conditions) and characteristics that are used to optimize individual communication sessions or classes of communication sessions. Examples of communication session criteria include, but are not limited to, bandwidth requirements, a maximum tolerable packet loss rate, one or more allowable applications, number of active on-premise devices simultaneously engaged in communication sessions, a maximum tolerable delay in voice, a maximum tolerable jitter, a minimum video frame rate, allowable geographical locations of intermediate nodes, etc. Generally, the communication session criteria may impact business rules, and vice versa.

Communication Session Parameters: information pertaining to and defining a specific communication session, such as the destination node for the communication session, the communication session type, an originating asset of the communication session, etc.

Communication Session Type: a predetermined class or categorization of communication sessions. Examples of communication session types include, but are not limited to, voice-based sessions, video-based sessions, multimedia-based sessions, file download sessions, email sessions, and the like.

Condition: sometimes synonymous with communication session criteria.

Facility: an abstraction that represents a collection of one or more assets housed together within an organization. For example, a facility may include a hospital, university, airport, one or more business units, a factory, a laboratory, a data center or some other similar site, and may also include one or more buildings (or floors inside a building) that houses assets.

IP: abbreviation for Internet Protocol (IP). Generally refers to a communication protocol for delivering any kind of electronic digital data across communication networks.

IT Infrastructure: a set of technology components, processes, data, and systems that are normally shared by users with technical and managerial competence at an organization.

Jitter: an undesired deviation from true periodicity of an assumed periodic signal in a communication session. Jitter tends to impact the quality of a voice-related or a video-related communication session.

Network: as used generally herein, a network is a global system of interconnected computers that use the standard Internet protocol suite to serve users worldwide with an extensive range of information resources and services. It will be understood that the term network in reality is actually a network of networks consisting of millions of private, public, academic, business, and government networks, of local to global scope, that are linked by a broad array of electronic, wireless and optical technologies. In one example, a network includes the Internet that provides the foundation of the world wide web of today. As referred to herein, nodes generally connect to networks.

Network Edge Device: represents a general purpose computer, dedicated PBX server, network attached component device, or other specific computing device or server that operates OCS software, is capable of being managed and/or controlled by the OCS, and generally includes an operative connection to one or more assets. Network edge devices are generally identified with several attributes, for example, a device identifier, a device type, a network address, a location, etc. Network edge devices are usually self-contained, compact, energy-efficient nodes running proprietary OCS software from flash memory or a Solid State Drive (SSD) that provide QoS guarantees to communication traffic associated with assets. As described herein, network edge devices are generally responsible for collecting network measurements such as packet loss, round trip times, transfer speed, and jitter, and interact with applications running on assets and associated IT Infrastructures. Generally, network edge devices are operatively connected to OCS server modules to exchange optimal routing information on a periodic or continual basis.

Network Event: a network occurrence warrants modification of an otherwise optimized communication session path for a given communication session. Examples of network events include, but are not limited to, power outages, node failures, communication tower failures or damage, natural disasters impacting nodes or groups of nodes, routine or unscheduled maintenance associated with nodes, terrorist attacks, and virtually any other event or occurrence affecting an otherwise optimized communication node or route.

Node: any kind of IP-enabled device that connects to a network and enables communication sessions. As referred to herein, nodes can be OCS-nodes (also referred to herein as OCS-compliant nodes) or non-OCS nodes (non-OCS-compliant nodes). Non-limiting examples of OCS nodes include network edge devices, provisioning servers, route servers, media proxy servers, statistics servers, etc. Examples of non-OCS nodes include PSTN nodes (i.e., nodes that are maintained by third party communication providers), PBX nodes (i.e., nodes that are connected to a PBX), etc. Generally synonymous with communication node.

Non-OCS-Compliant Node: nodes that are generally not capable of being controlled, managed, or manipulated by an embodiment of the OCS. Examples of non-OCS-compliant nodes include, but are not limited to, PSTN nodes, PBX nodes, and any other node maintained by an independent third party.

OCS-compliant node: a node operated and/or managed, or capable of being controlled, managed, or manipulated by an embodiment of the OCS.

Optimized Communication System (OCS): a system constructed as described in this document, that manages, monitors, and optimizes the end-to-end delivery of network traffic over third party networks so as to reduce or eliminate delay, jitter, latency, packet loss, and other such factors that are typically associated with IP-based communication traffic. OCS employs a distributed architecture comprising network edge devices installed inside a facility and OCS server modules located exterior to a facility.

Optimized Communication System (OCS) Directory: a directory comprising information identifying characteristics relating to nodes. Non-limiting examples of such information include (but are not limited to) IP addresses of the respective nodes, a type of classification of such nodes, and a type of application data (audio/video/data) the respective node handles.

Packet: a discrete unit of data that is routed between an origin (source node) and a destination (termination or destination node) on the Internet or any other packet-switched network.

Packet Switching: generally synonymous with the methods involved in sending and receiving data over one or more network paths between a source (origin) and a destination. Packets can be sent in order yet be received in a different order—only to be arranged in the correct order in a fraction of a second. Packets are subjected to various network conditions, e.g., packets can be delayed, lost, or can also be corrupted while being transported from an origin to a destination.

Premise: generally synonymous with facility (referenced above).

Private Branch Exchange (PBX): a private telephone network used within a facility with users sharing a certain number of outside lines for making telephone calls external to the PBX.

Plain Old Telephone System (POTS): a representation of the world's collection of interconnected voice-oriented public telephone networks, usually referring to both commercial and government-owned telephone networks.

Public Switched Telephone Network (PSTN): generally synonymous with POTS (referenced above).

Real Time Protocol (RTP): an application-layer protocol for the real-time transport of data such as audio and video data. Generally, RTP is equipped to handle the characteristics of IP routing, such as missing packets and out-of-sequence aggregation of packets.

Session Initiation Protocol (SIP): an application layer control (signaling) protocol for setting up, modifying, and disconnecting communication sessions involving one or more participants, such as two-party (unicast), or multi-party sessions comprising one or more media streams. SIP generally does not handle the actual transmission of the application data or media streams. Usually, a protocol such as RTP (referenced above) actually delivers the application data or media streams. SIP is similar to the HTTP or SMTP protocols in that a SIP message comprises headers and a message body. SIP can be generally regarded as the enabler protocol for telephony and Voice over IP (VoIP) services.

VoIP: abbreviation for Voice-Over-Internet-Protocol. Generally refers to a family of Internet technologies, communication protocols, and transmission technologies for delivery of voice, multimedia data, or generally, any kind of application data over Internet Protocol (IP) networks. As used herein, VoIP is not restricted purely to voice or audio communication sessions, but can relate to virtually any type of data communication sessions.

Overview

For the purpose of promoting an understanding of the principles of the present disclosure, reference will now be made to the embodiments illustrated in the drawings and specific language will be used to describe the same. It will, nevertheless, be understood that no limitation of the scope of the disclosure is thereby intended; any alterations and further modifications of the described or illustrated embodiments, and any further applications of the principles of the disclosure as illustrated therein are contemplated as would normally occur to one skilled in the art to which the disclosure relates. All limitations of scope should be determined in accordance with and as expressed in the claims.

Aspects of the present disclosure generally relate to systems and methods for managing and optimizing end-to-end communication sessions involving the delivery of application data (e.g., audio (voice) data, audio/video data, electronic file download data, etc.) over third party networks using an optimized communication system (OCS), as described herein. Embodiments of the disclosed system provide and maintain optimal quality (e.g., reduced delay, packet loss, jitter, etc.) of communication sessions. In one example, the system provides (a real-time or close to real-time) evaluation of the network conditions, e.g., which networks are congested, and other factors associated with geographically diverse and unpredictable routing infrastructure characteristics of the Internet. For the purposes of this disclosure, it will be generally understood that communication sessions utilize VoIP technologies and other data and information transfer technologies and protocols (as will occur to one of ordinary skill in the art) for transporting audio (voice) data, audio/video data, electronic file download data, etc. unless specifically stated otherwise. Also, the terms "call", "connection", "communication session" are generally synonymous and used broadly for the delivery of any kind of application data, and not just audio data.

Aspects of the disclosed system enables monitoring and managing all aspects of communication sessions that originate or terminate via various communication devices (e.g., phones, computers, audio/video conferencing equipment and the like). In one embodiment, the disclosed system utilizes a distributed architecture comprising a plurality of nodes, specifically, on-premise devices (e.g., installed at different geographical facilities) and off-premise servers that are operatively connected via one or more third party communication networks. Communication sessions proceed through communication session routes (or simply "routes") that are determined to be optimal by the OCS by monitoring network conditions and utilizing various business rules, wherein the routes proceed through one or more OCS nodes, as well as non-OCS nodes. Examples of OCS nodes include IVR server 120, voice mail server 122, network edge devices 106, and other devices described in more detail herein.

In one aspect, by monitoring network conditions in real time and non-real time, the OCS and its associated distributed architecture provides Quality of Service (QoS) guarantees by configuration, prioritization, and shaping of network traffic so as to provide and maintain optimal quality (e.g., reduced delay, packet loss, jitter, etc.) of certain types of communication sessions. In other aspects, system administrators, users of the OCS, and even software installed in the on-premise devices can specify business rules comprising various criteria that generally govern requirements of communication sessions. Examples of such criteria include a bandwidth requirement, a maximum tolerable packet loss rate, one or more allowable applications, number of active on-premise devices simultaneously engaged in communication sessions, a maximum tolerable delay in data transfer such as a voice transfer, a maximum tolerable jitter, a minimum video frame rate, allowable geographical location of intermediate nodes, etc. Aspects of the OCS, including (but not limited to) the distributed architecture of the OCS, monitoring of network conditions, applications of various business rules to the outcomes of monitoring network conditions, and several other concepts will be better understood from the discussions that follow herein.

Exemplary Embodiment

Referring now to the figures, FIG. 1 illustrates an overview 100 of an embodiment of an optimized communication system (OCS) 110 in an exemplary environment, constructed and operated in accordance with various aspects of the present disclosure. According to one embodiment, the OCS includes an Internet Protocol (IP)-based communication system architecture that provides users with an end-to-end, fully managed, and monitored system for transporting audio/video traffic over third party networks.

For purposes of discussions and explanations herein, it will be understood that a stream of incoming and/or outgoing communication sessions associated with network edge devices 106 may be referred to as "application data traffic", "media traffic", "communication traffic", or simply "traffic", at various places in this disclosure.

According to one aspect, the OCS 110 integrates (via network edge devices 106) with a plurality of assets 104 housed in facilities 102A and 102B for providing communication sessions (i.e., both incoming and outgoing) associated with the assets 104, e.g., communication session between assets 104 and assets 116 as shown in FIG. 1. It will be understood that a communication session between communicating assets can be in a two-party manner, or can involve other assets in a multi-party manner, e.g., in a multi-party conference call. In the example illustrated in FIG. 1, it is assumed that the OCS 110 handles both incoming and outgoing communication sessions for the assets 104, but not for the assets 116. As represented in FIG. 1, it is assumed for exemplary purposes that communication sessions in connection with assets 104 are managed and operated by the OCS, e.g., where such assets are geographically distributed across multiple facilities. However, for exemplary purposes, it is assumed that communication sessions in connection with assets 1116 are neither managed nor operated by the OCS. However, in alternate embodiments, it is possible that the OCS 110 handles communication sessions for both types of asset 104 and 116, e.g., as described in detail in connection with FIGS. 4, 5, and 6. Also, it will be understood that in alternate embodiments the asset 116 is not limited by connection to a switched telephone network, e.g., PSTN 118, as shown in FIG. 1. For example, in such embodiments, an asset 116 can be connected directly (i.e., without PSTN 118) to an IP network, such as network 108.

In FIG. 1, two facilities 102A and 102B are shown. But it will be understood that this is for illustrative purposes only. According to aspects of this disclosure, assets are not tied to facilities, no relation exists between various facilities, and facilities can be located in different geographical locations. Communication sessions involving assets 104 located in such facilities occur via one or more network(s) 108 and are typically associated with one or more of the following, e.g., a Web-deployed service with client/service architecture, a cellular data network, a cloud-based system, etc. Moreover, as will be understood and appreciated, various networking components (not shown in FIG. 1) like routers, switches, hubs etc., are typically involved in the communication sessions. Although not shown in FIG. 1, it will also be further understood that communication sessions may include one or more secure networks, and/or gateways/firewalls that provide information security from unwarranted intrusions and cyber attacks.

As shown, for example, in FIG. 1, an asset 104 may comprise a VoIP phone, a mobile phone, a fax machine, a conventional Plain Old Telephony System (POTS) phone, a smartphone, a cordless phone, a conference room speaker phone, a computer, a Bluetooth-enabled phone, a laptop, audio/video conferencing equipment, electronic gaming equipment, a printer, or more generally, any kind of network communication device. Further, in many facilities, analog overhead paging systems are utilized. Such legacy systems (including existing T1 and/or POTS trunks) can be integrated with the OCS 110 via adapters (not shown in the drawings). As will be understood, there is no limitation imposed on the number of assets, asset types, brands, vendors and manufacturers, etc.

According to one embodiment, and as shown in FIG. 1, the OCS 110 comprises one or more network edge devices 106 (also referred to in this disclosure as nodes) installed in relation (e.g., physically on-premise) to a facility and one or more remotely located OCS server modules 112 (e.g., a collection of computer servers or nodes that provide a suite of hosted services to create a complete, feature-rich communication system as will be discussed further in this disclosure) and one or more OCS databases 117 for storing data associated with providing communication sessions. In another embodiment, network edge devices 106 are operatively connected to the OCS server modules 112 via one or more third party network(s) 108, such as the Internet. As referred to herein, network edge devices and OCS server modules are generally referred to herein as "nodes". Thus, assets 104 are managed and controlled by the OCS via network edge devices 106 and OCS server modules. In contrast and for purposes of illustration, asset 116 is intended to represent an asset that is not managed and controlled by the OCS.

According to one aspect, network edge devices 106 are used to gather information about the assets 106 and conditions of the networks 108 in a periodic manner to probe the quality and characteristics of the one or more third party networks 108. It will be appreciated by one skilled in the art that because of the complex interconnections of a large number of networks with varying network characteristics and the way information is routed therein (e.g., according to a guarantee-less paradigm of the Internet protocol), quality of communication sessions occurring via the networks 108 are generally unpredictable and unreliable. For example, some nodes may be down or damaged, some nodes may have faster computational capabilities over other nodes, some nodes encounter more network congestion than other nodes, etc. Embodiments of the presently-disclosed OCS, among other things, are used to monitor the quality of networks 108 to provide reliable and optimized communication sessions between assets, as will be better understood from the discussions that follow herein. Specifically, and in one embodiment, the OCS monitors and collects real-time and historical network characteristics, applies business rules related to the network characteristics, evaluates various communication session routes/paths, and if necessary modifies communication routes to account for application of business rules and real-time network characteristics.

In a conventional system, an outgoing communication session will travel from asset 104 via one or more networks 108, through the IP-PSTN gateways 114 where IP traffic is converted into telephony traffic, and is finally delivered to asset 116. The reverse happens for an incoming communication session.

On the other hand, in an OCS environment, a network edge device 106 accepts an incoming communication session, and in one embodiment, if the incoming session requests a call attendant, then such a session is routed to an IVR server 120. In another embodiment, if the incoming session requests a voice mail, then such a session is routed to a voice mail server 122. However, if the incoming session requests an incoming voice data transfer to be set up, then in one embodiment, the network edge device 106 determines one or more optimal communication session nodes through which the voice data transfer will be routed. Such a determination depends on various factors—geographical proximity of the voice server to the network edge device, computing capabilities of the communication session node through which the voice call will be set up, and various such factors that will occur to one skilled in the art.

According to one aspect, network edge devices 106 are usually self-contained, compact, energy-efficient nodes operating proprietary OCS software from flash memory or Solid State Drives. These devices may be general purpose computers, dedicated PBX servers, or other computing devices that perform (among other things) the functionalities of the OCS, as described herein. According to another aspect and as shown in FIG. 1, an on-premise network edge device 106 sits between the network 108 (e.g., the Internet) and IT infrastructure 107, and manages (e.g., as described in FIGS. 4, 5, and 6) the communication traffic (i.e., both incoming and outgoing) between the local IT infrastructure 107 of the facility and the network 108. This methodology enables the on-premise network edge device to provide Quality of Service (QoS) information (e.g., for purposes of traffic shaping, configuration, prioritization, and monitoring functionalities, as will be discussed later herein) associated with assets 104. This optimization is often dictated by a plurality of business rules defined by OCS users, administrators, or pre-stored within the OCS. For example, such business rules might dictate that time-sensitive voice traffic is given greater priority over data traffic. This may result in more reliable media traffic, including (but not necessarily limited to) clearer, intelligible voice calls with negligible (less than 150 milliseconds) or no delay, or better quality rendering of audio/video data with no distortion, etc.

According to an embodiment, network edge devices (or more generally nodes) receive information relating to a plurality of network nodes via an OCS directory (e.g., as shown in FIG. 3), and also receive business rules that dictate optimization criteria. Information in the OCS directory is collected by aspects of the OCS server module 112, and provided to network edge devices 106, or other nodes wherein such information is utilized for determining optimal communication session routes in combination with business rules, as will be better understood from the discussions in connection with FIGS. 4,5, and 6. Generally speaking, business rules are policies/criteria that govern various aspects of communication sessions. Examples of such criteria include a bandwidth requirement, a maximum tolerable packet loss rate, one or more allowable applications, number of active on-premise devices simultaneously engaged in communication sessions, a maximum tolerable delay in voice data transfers, a maximum tolerable jitter, a minimum video frame rate, allowable geographical locations of intermediate nodes, etc. Business rules are usually defined by OCS users, system administrators, and are typically stored in the nodes.

It will be further understood that the terms "networks" or "networks 108" as used herein generally include any kind of computer-enabled (e.g., IP-enabled) digital network for transporting traffic associated with communication sessions. Usually such networks are offered as commoditized services and include a plurality of one or more third party sub-networks that are usually owned by third party network providers or third party carriers). Such sub-networks can be hard-wired or wireless (cellular, optical fiber, Wi-Fi, WiMax, proprietary networks, etc.), as will occur to one skilled in the art. Examples of third party network providers include entities such as LEVEL (3) COMMUNICATIONS™, COX COMMUNICATIONS™, COMCAST™, VERIZON™ AT&T™, etc. It will be understood by one skilled in the art that networks 108 can further include PSTN nodes such as IP-PSTN gateways 114 at the boundary of IP networks, and PSTN 118 for conversions between traditional switched telephony (PSTN) traffic and IP traffic.

In one embodiment, outgoing communication traffic (generated via the assets 104) is passed from network edge devices 106 to the networks 108 (i.e., specifically, the carriers or third party providers whose network connections are deemed to be optimum by the OCS 110 based on a variety of criteria such as high bandwidth, reduced delay, reduced latency, etc.). Incoming traffic to a facility 102 is directed to network edge devices 106 for eventual delivery to specific assets 104. Alternately, incoming traffic may be re-directed to an automated attendant, call queues, voicemail, an off-premise phone (e.g., a user's mobile phone or home phone). An exemplary OCS process showing steps involved in handling individual incoming and outgoing communication sessions is described in connection with FIG. 6.

According to yet another aspect, the assets 104 are connected to the network edge devices 106 via Ethernet cables (or, the like) in the IT infrastructure 107. In one embodiment, the network edge devices 106 usually include a managed Ethernet switch to provide electrical power to run the assets 104 using Power over Ethernet (PoE). This allows assets 104 to receive electrical power from the same Ethernet cable that connects the asset to the IT infrastructure 107. Consequently, there is no need for an AC power outlet and telephone power transformer that are conventionally required for powering assets (like telephones) at a facility. In one aspect, VLAN technology is used to keep voice and data separated on two different "Virtual LANs" that share the same physical LAN cable.

As will be described in greater detail herein, it will be understood that OCS embodiments provide the functionality of determining and enabling optimal communication session routes for incoming and outgoing communication sessions associated with various applications (e.g., voice-based applications, video-based applications, multimedia-based applications, file download applications, email applications, etc.).

Such communication session routes may comprise a plurality of intermediate nodes via networks 108, as will occur to one skilled in the art. Once an optimal communication session route is established (with or without intermediate nodes), data associated with the respective application is routed along this optimal communication session route, from the source to the destination. It will be understood and appreciated that the intermediate nodes can be OCS nodes, or nodes that are maintained/operated by third party communication providers, e.g., PSTN nodes.

The discussions above in association with FIG. 1 merely provide an overview of an embodiment of the present system for an Internet Protocol (IP)-based communication system architecture that provides users with an end-to-end, fully managed, and monitored system for transporting application data over third party networks, and is not intended to limit in any way the scope of the present disclosure. According to an alternate aspect (not shown herein), an on-premise network edge device 106 can connect to multiple networks 108 for added reliability and failover protection, e.g., an on-premise network edge device 106 can connect to a pre-existing POTS trunk. In another embodiment, intercom calls between assets 104 at the same or different facilities are routed over networks 108 without involving any OCS resources. In yet another embodiment not shown herein), network edge devices are servers in a datacenter with multiple available routes to route communication sessions, e.g., using multiple available networks 108. Various architectural details of an embodiment of the disclosed OSS will be described next in greater detail.

FIG. 2A and FIG. 2B illustrate exemplary system architectures 200A and 200B respectively of embodiments of the OCS 110 involving various modules and system components. The functions and operations of these exemplary modules and system components are described in greater detail below. As shown in FIG. 2A, the OCS 112, in one aspect, includes a distributed architecture comprising a plurality of nodes, specifically, installed in relation (e.g., physically on-premise) to a facility and off-premise (e.g., remotely located from the facility) servers that are operatively connected via one or more third party communication networks. Generally, communication sessions proceed through communication session routes (or simply routes) involving OCS nodes as well as non-OCS nodes, wherein the OCS determines which routes are optimal by monitoring network conditions, examining historical information, and implementing business rules. Examples of OCS nodes include IVR servers 120, voice mail servers 122, network edge devices 106, route servers 20, media proxy servers 222, and others. Examples of non-OCS include PSTN nodes such as PSTN gateways 114, and PSTN 118. (An alternate embodiment of OCS architecture is shown in FIG. 2B wherein the networks 108 do not include PSTN nodes, such as IP-PSTN gateways 114 or PSTN 118.)

In the disclosed embodiment in FIG. 2A, the OCS 110 integrates (via network edge devices 106) with a plurality of assets 104 housed in facilities 102A and 102B for transporting communication traffic associated with the assets 104, e.g., between assets 104 and assets 116. In the example illustrated, it is assumed that the OCS 110 handles both incoming and outgoing communication traffic for the assets.

According to one embodiment (and as shown in FIG. 1), the OCS 110 includes one or more OCS server modules 112 and one or more OCS databases 117. In one example, an OCS server module 112 comprises a plurality of constituent servers that provide various communication-related services such as (but are not limited to) voice mail, multi-party conferencing, automated attendant, ring groups, and other such services. Network edge devices 106 are operatively connected to the OCS server modules 112 via one or more third party network(s) 108, such as the Internet. The OCS database 117, for example, stores an OCS directory (shown exemplarily in connection with FIG. 3)) comprising information identifying nodes that are known and/or capable of being controlled or managed by the OCS.

Additionally, according to one aspect, information relating to assets 104 and conditions of the networks 108 is gathered by OCS nodes (e.g., one or more constituent servers in the OCS server module 112), and passed on to the statistics server 218 for analysis, and finally the analysis of such information is provisioned to the network edge devices 106. The constituent servers in the OCS server module 112 typically gather information relating to assets 104 and conditions of the networks 108 in a periodic manner, e.g., every few minutes, seconds, hours, or some other predetermined time-interval.

According to one embodiment, an OCS server module 112 comprises a collection of constituent servers, e.g., a provisioning server 216, a statistics server 218, a route server 220, and a media proxy server 222. Such constituent servers execute functionalities associated with the OCS server module 112. Examples of such functionalities include implementation of an optimal path identification module 224 (explained in FIG. 5A and FIG. 5B), and a new connection establishment module 226 (explained in FIG. 6).

In one embodiment, the provisioning server 216 maintains a list of business applications (e.g., voice communications, video communications, multimedia communications, Internet browsing sessions, etc.), their specific requirements, and a list of potential next-hop nodes, e.g., as described in FIG. 3. The provisioning server 216 is also used for general administrative and management purposes. The statistics server 218 is generally responsible for the collection and storage of information associated with network conditions, such as packet loss rate, round trip times, transfer speeds, etc. The statistics server 218 is also usually responsible for assimilating reports involving various statistics and analytics. Route servers 220 function to facilitate communications between nodes, and in one embodiment, like generic SIP proxy servers. For example, network edge devices 106 can communicate with route servers 220, which in turn can communicate with other nodes (such as conference servers, IVR servers, etc.). In one embodiment, route servers 220 may be involved in modifying parameters of communication sessions, e.g., as explained in FIG. 6. Media Proxy Servers 222 generally serve as intermediary connections between two communicating entities, and perform functionalities, for example, as described in FIG. 5B.

In one aspect, multiple (redundant) OCS server modules 112 (or, generally OCS nodes) are deployed at different geographical locations, typically co-located with the gateways 114 of one or more third party network providers. For example, in one aspect, a plurality of route servers and media proxy servers are deployed throughout various networks 108. Such geographical proximities of the OCS server module 112 (and its components) and the gateways 114 belonging to one or more third party carriers provide better audio/video quality by virtually eliminating latency and enabling the most efficient handling of such traffic. According to one aspect, the OCS server module 112 (typically, remotely located from facilities 102) also provides centralized management of communication services, and yet a distributed approach in association with the network edge devices 106 at the facilities 102. The distributed approach reduces the amount of traffic load on the IT infrastructure 107 at the facilities 102. Further, in one embodiment, features such as interactive voice response, music on hold, voicemail and other such features are stored at the OCS server module(s) 112.

In one embodiment, the OCS server module 112 is in communication with the network edge devices 106, and in the event that an OCS system failure renders the OCS server modules 106 non-operational, the network edge devices 106 at the facilities 102 have the capability to automatically switchover and utilize other third party carriers (or third party providers) and possibly the on-premise analog telephone connection (at the facility) to maintain the ability to send and receive calls. Generally, third party providers include PSTN nodes such as IP-PSTN gateways 114 at the boundary of IP networks, and PSTN 118 for conversions between traditional switched telephony (PSTN) traffic and IP traffic.

In another scenario, if anything (such as a lengthy power failure or a natural disaster) were to ever happen at the facility that makes the networks 108 connected to the network-edge devices 106 non-operational, the OCS server modules 106 will mimic the pre-existing IT infrastructure 107 so as to reroute calls to a backup phone line or even to users' cell phones when their extension at the facility is dialed.

Further, in the exemplary embodiment shown in FIG. 2A, the OCS server module 112 also includes an exemplary optimal path identification module 224 and a new connection establishment module 226. According to one aspect, the optimal path identification module 224 (explained in greater detail in connection with FIG. 5A and FIG. 5B) is implemented at an OCS node (e.g., network edge device 106) and generally relates to generating a determination of optimized communication paths for a communication session. According to another aspect, the new connection establishment module 226 is implemented in an OCS node for establishing new outgoing and receiving new incoming communication sessions.

It will be understood and appreciated that the specific modules and databases in FIG. 2 are shown for illustrative purposes only, and embodiments of the present system are not limited to the specific architecture shown. In one alternate example, functionalities of the provisioning server 216, statistics server 218, route server 220, and media proxy server 222 can be combined into a single or even multiple server module(s), possibly with other types of functionalities as will occur to one of ordinary skill in the art. Even further, various other information can be stored in the OCS databases 118, and are not limited to the ones described herein. In many scenarios, one or more servers can share the same data, as will occur to one skilled in the art.

Now referring to FIG. 2B, an alternate embodiment of OCS architecture 200B is shown, wherein the networks 108 do not include PSTN nodes, such as IP-PSTN gateways 114 or PSTN 118. The alternate embodiment comprises only OCS-compliant nodes that generally provide any communication-related functionalities even in the absence of the PSTN nodes. Also, it will be understood that no restrictions are imposed on the number of OCS server modules, including number of IVR servers 120, voice mail servers 122, and other types of nodes. The description and functionalities of various other elements shown in FIG. 2B are similar to that mentioned in FIG. 2A, and is therefore not repeated herein for brevity.

Moving to the description of FIG. 3, an exemplary schematic of an OCS directory 310 is shown, according to one embodiment of the present disclosure. According to one aspect, the OCS directory provides a "picture" of the geography and routing infrastructure of the networks 108 operated and maintained by a plurality of third party service providers/carriers. In one embodiment, such a picture is evaluated on the basis of metrics such as link quality, round trip times, jitter, packet loss rate, bandwidth, geographical location of nodes, and other metrics.

In one example, an OCS directory (e.g., the OCS directory 310) comprises information identifying nodes that are known and/or capable of being controlled or managed by the OCS. In one embodiment, the nodes include source nodes, (e.g., network edge devices), destination nodes, and nodes that are potential next-hop relays. Examples of information that is maintained for each node includes (but is not limited to) IP addresses of the respective nodes, types of classifications of such nodes, and type(s) of application data (audio/video/data) each respective node handles. Generally, classification (or "class" or "forking class") of nodes is a way of associating a predefined communication-related feature such as voice mail, interactive voice response (IVR), conference calling, and other such features with one or more servers, such as a voice mail server 122, an IVR server 120, a conference server (not shown herein), etc. In one embodiment, the classification is predefined by OCS users and/or system administrators. In other embodiments, classifications are performed based on the computing capabilities of nodes, the number of nodes of a given class that are already pre-existing in a given geographical area, and so on. In yet other embodiments, classifications can be based on having a same number of nodes in every class.

As shown in FIG. 3, an OCS directory generally comprises a list of nodes wherein each node has relevant information associated therewith such as a node ID (e.g., Node 1, Node 2, Node 3, etc.), a geographical location (e.g., Chicago, Atlanta, Dallas, etc.) associated with a node, an IP address for a respective node (e.g., 10.2.22.5), a class (IVR, voice mail, etc.), and a type of application data (e.g., audio, video, web data etc.) that a respective node can handle (or is optimized to handle). For example, a node (e.g., Node 8 in Atlanta) is associated with three (3) classes, such as conference, IVR, and voicemail. Even further, Node 8 handles audio and video application data.

According to one embodiment, and as shown in FIG. 3, the OCS directory is maintained and updated by the provisioning server 216. As will occur to one of ordinary skill, periodic can be every hour, minute, virtually continuously, etc. Information in the OCS directory is shared with network edge devices 106, or other nodes (route server, statistics server, etc.) that may require the information, wherein such information is utilized for determining optimal communication session routes in combination with business rules, as will be better understood from the discussions in connection with FIGS. 4, 5, and 6. In many scenarios the OCS directory is provided to other OCS servers and system components by the provisioning server periodically, while in other scenarios, a plurality of network edge devices 106A, 106B, and 106C, or other nodes request the OCS directory from the provisioning server (or, from the node maintaining the OCS directory). Information in the OCS directory is utilized by the network edge devices 106A, 106B, and 106C, or other nodes for determining optimal communication session routes, e.g., as explained in optimal path identification process in FIGS. 5A and 5B.

According to another embodiment, information in the OCS directory can pertain to nodes that are OCS nodes (also referred to herein as OCS-compliant nodes), or alternatively, nodes can be owned and operated by third party communication providers, e.g., PSTN nodes. It will be understood that the description of the OCS directory given above is for exemplary purposes only. Various other information attributes, and even other types of communication data (e.g., file download data, email data, software update data, and others) can be stored in the OCS directory, as will occur to one skilled in the art.

Turning now to FIG. 4, an exemplary flowchart representing high-level OCS processes 400 performed by an embodiment of the OCS 110 is shown. Details of steps performed by individual software and/or hardware components are explained in FIGS. 5A, 5B, and 6. As will be understood and appreciated, the steps of the process 400 shown in FIG. 4 may operate concurrently and continuously. Accordingly, the steps shown in FIG. 4 are generally asynchronous and independent, computer-implemented, tied to particular machines (including various modules and engines of the OCS nodes), and not necessarily performed in the order shown. In one embodiment, aspects of the OCS process 400 is performed at a network edge device 106. In other embodiments, aspects of the OCS process 400 are performed by various other OCS modules and system components in conjunction with network edge devices 106.

At a high level, the processes described and shown in FIG. 4 relate to identifying an optimal path or route for particular communication sessions, and then implementing the steps to carry out those communication sessions via the determined optimal paths. The OCS process in FIG. 4 starts at sub-process 500A (or, alternately sub-process 500B), in which an OCS node performs an optimal path identification process that is described in detail in FIG. 5A (or, alternately in FIG. 5B). In one embodiment, the optimal path identification process is performed periodically (every few minutes, seconds, or according to some other predetermined time interval), irrespective of whether the OCS node is processing a request for an outgoing communication session or accepting a request for an incoming communication session. If an OCS node wishes to establish an outgoing communication session or accept a request for an incoming communication session, then the OCS process 400 initiates sub-process 600 (described in greater detail in connection with FIG. 6).

Now referring to FIG. 5, (consisting of FIG. 5A or in alternate embodiments FIG. 5B), a flowchart is shown illustrating computer-implemented steps performed in an exemplary optimal path identification process 500A (or in alternate embodiments 500B). It will be recalled that an optimal path identification process 500 is generally a sub-process arising out of the high-level OCS process 400 described earlier in FIG. 4. It will be also recalled from the earlier discussions that embodiments of the disclosed OCS manage and enable optimal quality (e.g., reduced delay, packet loss, jitter, etc.) of communication sessions. Such functionalities (among others) are generally performed by an optimal path (or route) identification process 500.

As will be better understood from the discussions that follow, in one example, the system 110 enables evaluation of communication routes from each respective facility 102 (or even each asset 104 and/or network edge device 106 within a facility. Because each facility has different requirements and preferences (e.g., physical location, bandwidth availability, network transfer speed, quality of hardware, typical communication types, etc.) and because each type of communication generally requires optimization of different communication session criteria (e.g., reduce latency, improve packet loss, maximize transfer speed, improve communication reliability, etc.), each network edge device 106 generally determines optimized communication paths (routes) from or to each specific facility and/or asset. Thus, aspects of the process 500 assess historical and real time (or virtually real-time) evaluations of the network conditions (e.g., which networks are congested, which nodes are responding in a more efficient manner, etc.), predetermined business rules defining communication session criteria, and other factors associated with geographically diverse and unpredictable routing infrastructure characteristics of various networks 108.

In one embodiment, the steps mentioned in connection with FIG. 5 are performed by a network-edge device 106. In other embodiments, such steps are performed by other servers or modules of the OCS 110, such as a provisioning server, a statistics server, a route server, a media proxy server, or any other OCS-compliant device. Generally, process 500A relates to determination of optimized communication paths for a given node (e.g., network edge device 106). Additionally, FIG. 5B relates to further optimization of communication paths in which a network event is identified warranting modification of the otherwise optimized path for a given communication session. It will be understood that because FIG. 5B describes steps in an alternate embodiment of FIG. 5A, many of the steps in FIG. 5B are repeated in a similar manner to those shown in FIG. 5A. Also, for the sake of explanation and easy understanding, the steps in FIG. 5A are labeled with the suffix "A" and generally numbered as 502A, 504A, 506A, and so on. Similarly, the steps in FIG. 5B are labeled with the suffix "B" and generally numbered as 502B, 504B, 506B, and so on.

First starting at step 502A in FIG. 5A, a node (e.g., network edge device 106) receives information relating to the OCS directory (e.g., the OCS directory 310) and various business rules used to optimize communication sessions. In one embodiment, the information at step 502A is received at the node from some other node (e.g., the provisioning server 216). An exemplary schematic showing an OCS directory (usually comprising a list of potential nodes and information relating to such nodes that is used to optimize the communication sessions) was explained earlier in connection with FIG. 3. Also, generally speaking, business rules (or communication session criteria) relate to policies/criteria that govern various aspects of a communication session, such as a bandwidth requirement, a maximum tolerable packet loss rate, one or more allowable applications, number of active on-premise devices simultaneously engaged in communication sessions, a maximum tolerable delay in voice, a maximum tolerable jitter, a minimum video frame rate, allowable geographical locations of intermediate nodes, etc. Business rules are usually set by OCS users, defined by system administrators, created on-the-fly via proprietary system algorithms, and/or are predetermined policies stored in the node.

At step 504A, the node processes the received business rules by performing functionality dictated by (or otherwise associated with) the rules. According to one embodiment, the business rules define information needed to optimize certain communication sessions, ways to obtain such information, how to process such information, path and/or node ranking methodologies, and include other similar types of information. For example, such functionality governed by the business rules may dictate that the node analyze connectivity to one or more potential nodes listed in the OCS directory using Internet Control Messaging Protocol (ICMP) messages, historic Real Time Control Protocol (RTCP) data, and/or communication session protocol-specific messaging (e.g., SIP options). It will be understood that an example of a communication session protocol is the Session Initiation Protocol (SIP).

Generally, business rules are created by an OCS user or system administrator in relation to accomplishing various evaluations (both current and over time) of network conditions, e.g., which networks are congested, which nodes have failed, which are the best nodes for certain types of communication sessions, etc., and other factors associated with geographically diverse and unpredictable routing infrastructure characteristics of the Internet. Such evaluations, in OCS embodiments, are utilized to determine optimal communication session routes as packets proceed through one or more intermediate nodes in the Internet. For example, rules may be used to determine the bandwidth of a network connection, limit the bandwidth to certain applications if enough bandwidth is not available, determine the round-trip delay upon transmission of a set of predetermined control packets, etc. In many scenarios, rules can have mutual interdependencies. For example, such a business rule might indicate that if packet loss rate is greater than 10%, abort execution of other rules.

Next, at step 506A, the node assimilates information based on processing business rules. In other words, a node can process multiple business rules, and each rule can involve more than one function. (An example of a business rule with multiple functions is given at the end of the description of FIG. 5B.) Further, many business rules require combination of many different information types and individual items of information to enable prioritization of communication nodes and routes. Consequently, at step 506A, the node assimilates (aggregates) the outcomes resulting from processing the business rules. (An exemplary list of prioritized communication nodes will be discussed in connection with FIG. 7.)

From the assimilated outcomes of step 506A, the node generates (at step 510A) and thereafter stores (at step 512A) a prioritized list of nodes that can be used in subsequent communication sessions. In one embodiment, the prioritized list of nodes represent potential preferred "next-hop" nodes for a variety of communication types and specific communication sessions emanating to or received at the node (network edge device). As will be understood and appreciated, the prioritized list of nodes is generated based on evaluation of the outcome (information) of the business rules, which might include information indicating current network conditions (e.g., which networks are congested), the associated delays for each node and/or route, packet loss rates, and jitter, etc., and other factors associated with geographically diverse and unpredictable routing infrastructure characteristics of networks 108.

Thus, conventionally, in a non-OCS environment, communication sessions are handed off to the network without determining whether the intermediate nodes in the network are capable of handling such sessions or not. In contrast, according to the presently-disclosed OCS methodology, communication sessions are routed to nodes that optimize the characteristics desired for each particular communication session.

It will be even further appreciated that this methodology of generating a prioritized list of nodes (comprising potential next-hop nodes) help eliminate communication session routes that have been impacted by communication failures (e.g., communication tower problems due to disaster, natural calamities, or routine maintenances, or some other unpredictable reason).

Now moving to FIG. 5B, an alternate exemplary optimal path identification process 500B is illustrated, according to an alternate embodiment of the present disclosure. As referenced above, the process 500B shown in FIG. 5B relates to further optimization of communication paths in which a network event is identified warranting modification of the otherwise optimized path for a given communication session. Among other aspects, the alternate embodiment shows extra steps 550, 552, and 556 associated with handling network issues for a set of additional relay nodes (e.g., media proxy servers 222) in addition to other OCS nodes. Generally, these additional relay nodes are geographically distributed in different locations and serve to avoid network events (e.g., communication tower or node problems due to natural disaster, unexpected outages, routine maintenance, or any other unpredictable and current reason affecting incoming and outgoing communication sessions). As recited previously, some steps in FIG. 5B are similar to ones with corresponding numbers explained in FIG. 5A, and have been repeated herein to accommodate the alternate embodiment. Hence, the details of such steps are not repeated in the description of FIG. 5B, for the sake of brevity.

Moving directly to step 504B, after receiving the OCS directory information and the relevant business rules, the node processes the business rules by performing functionality dictated by (or associated with) the rules. Then, from step 504B, the process enters steps 550, 552, and 556, as will be better understood from the discussions that follow herein. After step 556, the OCS process merges with step 506B, and continues to execute in a similar manner as described previously in FIG. 5A.

At step 550, the OCS determines whether or not a network event (e.g., issues relating to network connectivity or quality) is detected based on various network checks dictated by the business rules. If no issues are detected (e.g., all available or relevant communication nodes in various networks 108 are operating in a typical or expected manner), then step 506B is performed by the node, and process 500B continues in a similar manner as process 500A described previously in FIG. 5A.

If, however, a network event is detected, the OCS branches off to step 552, and assimilates information based on detection of network issues. In one example, a network event is detected if a node (i.e., a next-hop OCS-node or a next-hop non-OCS node) fails or takes too long to respond to a control packet or ICMP ping. In another example, third party carriers inform the OCS (via some means) if one or more non-OCS nodes are down.

Next, the process moves to step 556, wherein the node generates a list of prioritized relay nodes (e.g., media proxy servers 222), based on information relating to the one or more identified network events. In one embodiment, the prioritized relay nodes that are deployed act as replicas (or, substitutes) of nodes that otherwise would have been optimal. In other embodiments, the prioritized relay nodes are those that meet some network characteristic or condition of the nodes affected by the network event. For example, if an otherwise optimized node is impacted by a network event (e.g., a communication tower is destroyed due to a violent windstorm), then the OCS may identify relay nodes (media proxy servers/nodes 222) in relative geographical proximity to the affected nodes. Or, if other relay nodes are capable of handling the same communication types, bandwidth requirements, transfer speeds, computing capabilities, etc. of the affected node, then those nodes may be substituted as relay nodes to enable the communication session to avoid the network event. It will be understood that more than one OCS node may be affected, in which case, the OCS may identify one or more relay nodes to address and avoid the network event.

After step 556, the OCS process 500B merges with step 506B, and continues in a similar manner to the corresponding process steps described in FIG. 5A. Additionally, at step 510B, the node (e.g., network edge device 106) creates a list of prioritized nodes, including the list of prioritized relay nodes (created earlier in step 556). Generally, the list of prioritized relay nodes is reconciled with the list of otherwise prioritized nodes to determine optimized communication paths for certain communication session criteria. For example, a given prioritized relay node may or may not be utilized in a subsequent communication session depending on the specifics of that session (e.g., the optimized path for the communication session may not suggest transfer through an impacted network node or area). Generally, the list of prioritized nodes (including the list of prioritized relay nodes) is stored (at step 512B) in one or more OCS databases, and the process exits thereafter.

In many OCS embodiments, such a prioritized list of nodes, for example, can be used by the OCS server modules 112 (and other OCS nodes) for determining the placement of additional relay nodes in different geographical locations. In one exemplary embodiment, relay nodes are RTP proxies or SIP proxies that are distributed in different geographical locations for redundancy purposes. Before continuing further in this disclosure, for purposes of explanation and illustration, an example of a business rule and associated processing is described below.

In a hypothetical scenario, an organization may have a facility that has 5 phones (i.e., assets 104) within the facility, and the phones each have a 160 Kbps bandwidth requirement. Thus, a first business rule may be to determine whether the one or more networks 108 connected to the facility are able to provide necessary bandwidth for these phones. If the outcome of the first business rule states that enough bandwidth is not available, then a second business rule may be to determine whether the OCS 110 (via the IT Infrastructure 107) needs to limit the bandwidth being consumed by other services on the identified bandwidth connection. An additional business rule may be to determine which nodes (both OCS-compliant and non-OCS-compliant) are geographically closest to the given facility (e.g., the closest conference call servers, voice mail servers, interactive voice response servers, etc.). Accordingly, a fourth business rule may be to send 50 control packets to each of the closest nodes to receive return packets indicating various types of information. Based on the outcomes associated with the 50 control packets, a fifth business rule could be to analyze various multiple network attributes (e.g., determine the variation) in the delivery of the 50 control packets. This information can all be used (along with a multitude of other rules) to prioritize and optimize the nodes for transmitting communication sessions.

Generally, business rules are associated with characteristics of communication sessions, or gathering information relating to communication sessions. Also, in several OCS embodiments, the business rules can be weighted so that certain factors can be emphasized more than others. For example, for a facility with high call volume or large amounts of data transfer, business rules associated with bandwidth connection may be given the highest weight and priority over other rules. In another example, a business rule can indicate if packet loss is greater than 10%, abort processing other business rules. It will be understood that the discussions in connection with FIG. 5A and FIG. 5B are for purposes of illustration only. It will occur to one skilled in the art that OCS embodiments can have various other business rules and associated processing steps. Further, in many scenarios, the selection between FIG. 5A and FIG. 5B is dependent on business rules pre-specified by OCS users and system administrators, or even based on automated decisions taken by the OCS (i.e., OCS nodes).

After nodes (and, consequently, paths) have been optimized by a given node (e.g., a given network edge device 106), the node may receive an indication that a system user wishes to initiate a communication session. As will be understood and appreciated (and as explained above), the steps in processes 500A and 500B are operating on a continuous and periodic basis, and thus the resulting prioritized lists of nodes are continually changing based upon updates to network conditions, business rules, and the like. Thus, as will be understood and appreciated by one of ordinary skill in the art, the steps of processes 500 and 600 (described in greater detail below) operate asynchronously and on an ongoing basis.

Referring to FIG. 6, a connection establishment process 600 (alternatively termed as a communication establishment process) is shown, as performed by an OCS-node for establishing outgoing and receiving incoming communication sessions, according to one embodiment of the present system. It will be recalled that a connection establishment process 600 is generally a sub-process arising out of the high-level OCS node process 400 described earlier in connection with FIG. 4. As will be understood, in various embodiments a node can be a network edge device 106, a provisioning server 216, a statistics server 218, a route server 220, a media proxy server 222, or any other device capable of performing the functionalities of the OCS. Although nodes can generally comprise any generic IP-enabled device, it will be understood that the OCS processes (e.g., as described in FIGS. 4, 5, 6, and other drawings herein) will generally be executed at those nodes that are OCS-compliant.

Starting at step 602, a node receives parameters indicating the request to start a communication session. Examples of such parameters include (but are not limited to) a source address field (usually 64 bits long), a destination address field (usually 64 bits long), an indication corresponding to an incoming or an outgoing communication session, a type of communication, and optional fields that are implementation-specific. Typically, a node receives such parameters by parsing the information in one or more received SIP packets, such SIP packets either originating at the node (when the node is the originator of the communication, i.e., a source node), or in other scenarios, received from another node that acts as an upstream node. In those scenarios, the present node acts a relay or forwarder (or the ultimate destination node).

Thus, at step 604, the node determines, based on the communication session parameters, whether or not the request for a communication session is for an outgoing session or an incoming session. Generally, an outgoing communication session is one in which the present node (i.e., the node performing the steps illustrated in FIG. 6) is the source node, or some other downstream or routing node that is not the ultimate destination of the communication session. In other embodiments, if the present node is not the source node, but is making a decision to potentially re-route or modify a communication session, then the present node may also be handling an outgoing communication session. Alternatively, an incoming communication session (i.e., not an outgoing session) is one in which the present node is the ultimate destination node for the communication, or if the present node is not the ultimate destination, but is receiving the communication from an upstream node that is not OCS-compliant. Other examples of outgoing and incoming communication sessions will occur to one of ordinary skill in the art.

In what follows next, steps involved in processing a request for an incoming communication session will be described. If the node determines at step 604 that the request is for an incoming session, then the node enters step 606, otherwise, the node enters step 650. In many OCS embodiments, if the request for an incoming communication session is from an upstream node that is OCS-compliant, then the node simply accepts the request. Specifically, if an upstream node is OCS-compliant, then it is assumed that the node optimized its communication paths prior to transmitting the communication, and thus downstream communication modification may be unnecessary. In other embodiments, however, if downstream communication modification is desired (even for source and/or relay nodes that are OCS-compliant), then the received communication may be treated as an outgoing communication session. Assuming an embodiment, however, in which downstream communication modification is not desired, at step 606, the node determines whether or not the upstream node is an OCS-compliant node. If so, then at step 608, the node accepts the communication request, and the process terminates thereafter. Even in the embodiment in which downstream modification is not desired, some aspects of the present system may still perform a validation check to ensure that a sending node is a preferred node. In those situations, the steps of FIG. 6 relating to incoming sessions may be performed as if the upstream node is not OCS-compliant.

At step 606, if the receiving (present) node determines that the upstream node is not an OCS-compliant node, then at step 610 the node retrieves a predetermined list of nodes from the local database. It will be appreciated that according to aspects of this disclosure, the OCS provides functionality to nodes to accept/process requests from non-OCS compliant nodes that are preferred, based on predetermined criteria. Information identifying such preferred, non-OCS compliant nodes are usually provided in the predetermined list of nodes, described above. Correspondingly, the node performs a validation (at step 612) of whether or not information relating to the upstream node is present in the predetermined list, e.g., the validation process determines if the upstream node is a preferred node or not. If information relating to upstream node is present in the predetermined list (i.e., the upstream node is one of a handful of predetermined, preferred nodes that are not OCS-compliant), then the node accepts (at step 608) the request for the incoming communication session.

If, at step 612, the node determines that information relating to upstream node is not present in the predetermined list (i.e., the upstream node is not a preferred node), the node next determines (at step 614) if all nodes in the predetermined list have been checked to be a potential upstream node. As will be understood, in one aspect, the OCS enables nodes to choose a potential upstream node (e.g., in a round-robin manner) from the predetermined list of potential upstream nodes. If the node determines (at step 614) that all nodes in the predetermined list of potential upstream nodes have not been checked to be a potential upstream node (i.e., there are still nodes remaining in the list through which the incoming communication session could be routed), them the node rejects (at step 616) the upstream node whose information was validated in step 612. Next, the node transmits (at step 618) a message to the upstream node indicating failure of the request for the incoming communication session. When the upstream node receives the error message indicating connection failure, the upstream node generally attempts the communication via another node (or path), in which case the process reverts back to step 612.

At step 614, if the OCS determines all nodes in the predetermined list have been checked to be potential upstream nodes, but the upstream node never attempted the communication via a preferred node, then the process 600 loops back to step 608, thereby accepting the request for a communication session from the upstream node in a non-optimized manner.

In what follows next, steps involved in processing a request for an outgoing communication session will be described, beginning with the branch of process 600 starting with step 650. Specifically, it will be discussed that a number of decision steps are implemented at the beginning of this OCS-node process. These decision steps determine various conditions in an OCS-node implemented outgoing communication process. It will be further understood from the following discussions that in one embodiment, a node (or, equivalently an OCS-node) requests, forwards, transmits, and/or establishes communication sessions to a downstream node that may or may not be OCS-compliant. At step 650, the OCS-node determines whether or not the OCS-node is a source node (i.e., originator of a communication session). If yes, then the process moves to step 654, and further determines whether or not the downstream node is an OCS-compliant node. However, if the node is not a source node, then the process determines (at step 652) whether or not the upstream node is an OCS-compliant node. If the upstream node is not an OCS-compliant node, the process moves to step 654. If the upstream node is an OCS-compliant node and/or the downstream node is not an OCS-compliant node, then the node next determines (at step 656) whether or not the downstream node is a destination node. If the downstream node is not a destination node, the process moves to step 658 wherein the OCS-node retrieves a pre-created (as explained earlier in connection with FIG. 5A and FIG. 5B) list of prioritized nodes from a local OCS-node database. Next, at step 660 the node sets the downstream node based on information in the prioritized list, and then moves to step 664. According to one aspect, setting the downstream node to a different node entails the node assigning the downstream node as a node in the list of prioritized nodes.

However, if at step 656, the node determines that the downstream node is indeed a destination node, then at step 662, the node sets the downstream node as the destination and then moves to step 664. At step 664, the node modifies parameters of the requested communication session to the downstream node. For example, the node modifies the packet by changing the address in the header of the SIP packet received at earlier step 602 to the newly assigned downstream node. In SIP, this can be achieved by using an X header or URI parameter, for example. It will occur to one skilled in the art that the parameters of the requested communication session are usually set by the application protocol. So, modification of parameters of the requested communication session enable the communication session to proceed through a communication session route that is optimized, as described above. Finally, at step 666, the node establishes an outgoing communication session with the downstream node, and the OCS process exits thereafter.

FIG. 7 illustrates an exemplary representation of a prioritized list of communication nodes 310', according to one embodiment of the present disclosure. As mentioned previously, aspects of the present OCS 110 enable ranking or prioritization of nodes for various types and aspects of communication sessions, based on a variety of criteria and factors. In the exemplary, non-limiting list 310' shown in FIG. 7, the OCS directory 310 has been updated with a new column representing a priority or ranking of the nodes originally included in the list. The priority may be relevant to each class of node, or based on geographical location of the nodes, or based on the preferred communication type that can be handled by the node, or may be an overall ranking of all nodes, or any other ranking methodology as will occur to one of ordinary skill in the art. As shown in the example in FIG. 7, the nodes for each class of communication have been separately ranked. Thus, as shown, node 1 is the most optimized node for IVR communications, whereas node 3 is the second most optimized node for such classes of communications, and node 7 is the third most optimized node. As mentioned previously, the lists and or ranking of the nodes (similar to the representation of the nodes shown in FIG. 7 (and earlier in FIG. 3)) are generally updated frequently and/or continuously as new information is obtained within the OCS, new business rules are developed, network events occur, etc. As shown in FIG. 7, in one embodiment, the prioritized list of communication nodes 310' is updated and maintained by network edge devices 106. However, as recited in various places in this disclosure, in alternate embodiments, OCS nodes (e.g., route servers 220, statistics servers 218, and other OCS nodes) can also maintain and update the prioritized list of communication nodes 310'.

Although not shown herein, it will be understood that various data attributes associated with the above-described process can be stored in OCS-node databases, as will occur to one skilled in the art. Also, in many OCS embodiments, the downstream node is a route server (e.g., a SIP proxy server or a back-to-back user agent (B2BUA)). Although not shown explicitly, it will be understood that the steps in FIG. 6 (as well as steps in other flowcharts mentioned herein) can be repeated at a plurality of nodes, until a communication session route is established, as will occur to one skilled in the art. Once an optimal communication session route is established (with or without intermediate nodes), the application data (audio/video/data) is routed along this optimal communication session route, from the source to the destination. It will be understood and appreciated that the intermediate nodes can be OCS nodes or nodes that are maintained/operated by third party communication providers.

Aspects of the present disclosure generally relate to systems and methods for managing and optimizing end-to-end communication sessions involving the delivery of application data (e.g., audio (voice) data, audio/video data, electronic file download data, etc.) over third party networks using an optimized communication system (OCS), as described herein. Embodiments of the disclosed system provide and maintain optimal quality (e.g., reduced delay, packet loss, jitter, etc.) of communication sessions. In one example, the system provides (a real-time or close to real-time) evaluation of the network conditions, e.g., which networks are congested, and other factors associated with geographically diverse and unpredictable routing infrastructure characteristics of the Internet.

Accordingly, it will be understood that various embodiments of the present system described herein are generally implemented as a special purpose or general-purpose computer including various computer hardware as discussed in greater detail below. Embodiments within the scope of the present invention also include computer-readable media for carrying or having computer-executable instructions or data structures stored thereon. Such computer-readable media can be any available media which can be accessed by a general purpose or special purpose computer, or downloadable through communication networks. By way of example, and not limitation, such computer-readable media can comprise physical storage media such as RAM, ROM, flash memory, EEPROM, CD-ROM, DVD, or other optical disk storage, magnetic disk storage or other magnetic storage devices, any type of removable non-volatile memories such as secure digital (SD), flash memory, memory stick etc., or any other medium which can be used to carry or store computer program code in the form of computer-executable instructions or data structures and which can be accessed by a general purpose or special purpose computer, or a mobile device.

When information is transferred or provided over a network or another communication connection (either hardwired, wireless, or a combination of hardwired or wireless) to a computer, the computer properly views the connection as a computer-readable medium. Thus, any such a connection is properly termed and considered a computer-readable medium. Combinations of the above should also be included within the scope of computer-readable media. Computer-executable instructions comprise, for example, instructions and data which cause a general purpose computer, special purpose computer, or special purpose processing device such as a mobile device processor to perform one specific function or a group of functions.

Those skilled in the art will understand the features and aspects of a suitable computing environment in which aspects of the invention may be implemented. Although not required, the inventions are described in the general context of computer-executable instructions, such as program modules or engines, as described earlier, being executed by computers in networked environments. Such program modules are often reflected and illustrated by flow charts, sequence diagrams, exemplary screen displays, and other techniques used by those skilled in the art to communicate how to make and use such computer program modules. Generally, program modules include routines, programs, objects, components, data structures, etc. that perform particular tasks or implement particular abstract data types, within the computer. Computer-executable instructions, associated data structures, and program modules represent examples of the program code for executing steps of the methods disclosed herein. The particular sequence of such executable instructions or associated data structures represent examples of corresponding acts for implementing the functions described in such steps.

Those skilled in the art will also appreciate that the invention may be practiced in network computing environments with many types of computer system configurations, including personal computers, hand-held devices, multiprocessor systems, microprocessor-based or programmable consumer electronics, networked PCs, minicomputers, mainframe computers, and the like. The invention is practiced in distributed computing environments where tasks are performed by local and remote processing devices that are linked (either by hardwired links, wireless links, or by a combination of hardwired or wireless links) through a communication network. In a distributed computing environment, program modules may be located in both local and remote memory storage devices.

An exemplary system for implementing the inventions, which is not illustrated, includes a general purpose computing device in the form of a conventional computer, including a processing unit, a system memory, and a system bus that couples various system components including the system memory to the processing unit. The computer will typically include one or more magnetic hard disk drives (also called "data stores" or "data storage" or other names) for reading from and writing to. The drives and their associated computer-readable media provide nonvolatile storage of computer-executable instructions, data structures, program modules, and other data for the computer. Although the exemplary environment described herein employs a magnetic hard disk, a removable magnetic disk, removable optical disks, other types of computer readable media for storing data can be used, including magnetic cassettes, flash memory cards, digital video disks (DVDs), Bernoulli cartridges, RAMs, ROMs, and the like.

Computer program code that implements most of the functionality described herein typically comprises one or more program modules may be stored on the hard disk or other storage medium. This program code, as is known to those skilled in the art, usually includes an operating system, one or more application programs, other program modules, and program data. A user may enter commands and information into the computer through keyboard, pointing device, a script containing computer program code written in a scripting language or other input devices (not shown), such as a microphone, etc. These and other input devices are often connected to the processing unit through known electrical, optical, or wireless connections.

The main computer that effects many aspects of the inventions will typically operate in a networked environment using logical connections to one or more remote computers or data sources, which are described further below. Remote computers may be another personal computer, a server, a router, a network PC, a peer device or other common network node, and typically include many or all of the elements described above relative to the main computer system in which the inventions are embodied. The logical connections between computers include a local area network (LAN), a wide area network (WAN), and wireless LANs (WLAN) that are presented here by way of example and not limitation. Such networking environments are commonplace in office-wide or enterprise-wide computer networks, intranets and the Internet.

When used in a LAN or WLAN networking environment, the main computer system implementing aspects of the invention is connected to the local network through a network interface or adapter. When used in a WAN or WLAN networking environment, the computer may include a modem, a wireless link, or other means for establishing communication sessions over the wide area network, such as the Internet. In a networked environment, program modules depicted relative to the computer, or portions thereof, may be stored in a remote memory storage device. It will be appreciated that the network connections described or shown are exemplary and other means of establishing communication sessions over wide area networks or the Internet may be used.

In view of the foregoing detailed description of preferred embodiments of the present invention, it readily will be understood by those persons skilled in the art that the present invention is susceptible to broad utility and application. While various aspects have been described in the context of a preferred embodiment, additional aspects, features, and methodologies of the present invention will be readily discernable from the description herein, by those of ordinary skill in the art. Many embodiments and adaptations of the present invention other than those herein described, as well as many variations, modifications, and equivalent arrangements and methodologies, will be apparent from or reasonably suggested by the present invention and the foregoing description thereof, without departing from the substance or scope of the present invention. Furthermore, any sequence(s) and/or temporal order of steps of various processes described and claimed herein are those considered to be the best mode contemplated for carrying out the present invention. It should also be understood that, although steps of various processes may be shown and described as being in a preferred sequence or temporal order, the steps of any such processes are not limited to being carried out in any particular sequence or order, absent a specific indication of such to achieve a particular intended result. In most cases, the steps of such processes may be carried out in a variety of different sequences and orders, while still falling within the scope of the present inventions. In addition, some steps may be carried out simultaneously.

What is claimed is:

1. In an optimized communication system (OCS) including operative connections through one or more networks to a plurality of communication nodes for enabling communication sessions via the one or more networks, a method for optimizing incoming communication sessions, comprising the steps of:
   receiving an indication at a particular communication node of an incoming communication session, wherein the indication includes information identifying a sending node;
   upon determination that the sending node is not an OCS-compliant node, retrieving a predetermined list of preferred communication nodes from a local communication node database, wherein the preferred communication nodes are included in the predetermined list at least partially based on a communication session type associated with each preferred communication node;
   parsing the predetermined list of preferred communication nodes to determine whether the sending node is present in the predetermined list of preferred communication nodes; and
   if the sending node is present in the predetermined list of preferred communication nodes, accepting the incoming communication session from the sending node.

2. The method of claim 1, wherein the particular communication node is a provisioning server for storing and maintaining the predetermined list of preferred communication nodes.

3. The method of claim 1, wherein the particular communication node is a statistics server for receiving and storing information associated with network conditions.

4. The method of claim 1, wherein the indication includes parameters defining the incoming communication session.

5. The method of claim 1, wherein the sending node comprises a source node that originated the incoming communication session.

6. The method of claim 1, wherein the sending node comprises a relay node that did not originate the incoming communication session.

7. The method of claim 1, wherein the OCS includes an OCS server module for performing various functionalities of the OCS.

8. The method of claim 7, wherein the preferred communication nodes are managed by the OCS server module.

9. The method of claim 7, wherein the preferred communication nodes are not managed by the OCS server module.

10. The method of claim 1, wherein the preferred communication nodes are selected from the group comprising: route nodes, media proxy nodes, relay nodes, communication-type-defined nodes.

11. The method of claim 1, wherein the predetermined list of preferred communication nodes is defined by one or more of the following: an OCS administrator, a local user of the particular communication node, automatically by the particular communication node, automatically by an OCS server module.

12. The method of claim 1, wherein the particular communication node comprises a network edge device.

13. The method of claim 1, wherein the step of parsing the predetermined list of preferred communication nodes to determine whether the sending node is present in the predetermined list of preferred communication nodes takes into account the communication session type associated with each node.

14. The method of claim 1, wherein the step of parsing the predetermined list of preferred communication nodes to determine whether the sending node is present in the predetermined list of preferred communication nodes takes into account network characteristic information corresponding to the preferred communication nodes.

15. The method of claim 1, wherein the communication session type is a particular class of communication traffic of one or more classes of communication traffic that can be routed by each of the possible communication nodes.

16. The method of claim 15, wherein the communication session type comprises one or more of voice mail, interactive voice response (IVR), conference calling, voice-based sessions, video-based sessions, multimedia-based sessions, file download sessions, and email sessions.

17. In an optimized communication system (OCS) including operative connections through one or more networks to a plurality of communication nodes for enabling communication sessions via the one or more networks, a method for optimizing incoming communication sessions, comprising the steps of:
 receiving an indication at a particular communication node of an incoming communication session, wherein the indication includes information identifying a sending node;
 upon determination that the sending node is not an OCS-compliant node, retrieving a predetermined list of preferred communication nodes from a local communication node database;
 parsing the predetermined list of preferred communication nodes to determine whether the sending node is present in the predetermined list of preferred communication nodes, wherein the preferred communication nodes are included in the predetermined list at least partially based on a communication session type associated with each preferred communication node;
 if the sending node is not present in the predetermined list of preferred communication nodes, determining whether the incoming communication session has been attempted through all preferred communication nodes in the predetermined list of communication nodes; and
 if the incoming communication session has not been attempted through all preferred communication nodes in the predetermined list of communication nodes, rejecting the incoming communication session,
 whereby the incoming communication session is received at the particular communication node via a second sending node.

18. The method of claim 17, wherein the particular communication node is a provisioning server for storing and maintaining the predetermined list of preferred communication nodes.

19. The method of claim 17, wherein the particular communication node is a statistics server for receiving and storing information associated with network conditions.

20. The method of claim 17, wherein the indication includes parameters defining the incoming communication session.

21. The method of claim 20, wherein the parameters comprise a source indication field.

22. In an optimized communication system (OCS) including operative connections through one or more networks to a plurality of communication nodes for enabling communication sessions via the one or more networks and an OCS server module for performing various functionalities of the OCS, a method for optimizing incoming communication sessions, comprising the steps of:
 receiving an indication at a particular communication node of an incoming communication session, wherein the indication includes information identifying a sending node;
 upon determination that the sending node is not an OCS-compliant node, retrieving a predetermined list of preferred communication nodes from a local communication node database, wherein the preferred communication nodes are managed by the OCS server module;
 parsing the predetermined list of preferred communication nodes to determine whether the sending node is present in the predetermined list of preferred communication nodes, wherein the preferred communication nodes are included in the predetermined list at least partially based on a communication session type associated with each preferred communication node; and
 if the sending node is present in the predetermined list of preferred communication nodes, accepting the incoming communication session from the sending node.

23. The method of claim 22, wherein the communication session type is a particular class of communication traffic of one or more classes of communication traffic that can be routed by each of the possible communication nodes.

24. The method of claim 23, wherein the communication session type comprises one or more of voice mail, interactive voice response (IVR), conference calling, voice-based sessions, video-based sessions, multimedia-based sessions, file download sessions, and email sessions.

* * * * *